United States Patent
Uehara et al.

(10) Patent No.: US 10,394,067 B2
(45) Date of Patent: Aug. 27, 2019

(54) DETECTION DEVICE

(71) Applicant: Japan Display Inc., Tokyo (JP)

(72) Inventors: Toshinori Uehara, Tokyo (JP); Hiroshi Mizuhashi, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/826,078

(22) Filed: Nov. 29, 2017

(65) Prior Publication Data

US 2018/0157084 A1 Jun. 7, 2018

(30) Foreign Application Priority Data

Dec. 1, 2016 (JP) ................. 2016-234238

(51) Int. Cl.
*G06F 3/041* (2006.01)
*G02F 1/1333* (2006.01)
*G02F 1/1343* (2006.01)
*G06F 3/044* (2006.01)

(52) U.S. Cl.
CPC ........ *G02F 1/13338* (2013.01); *G02F 1/1343* (2013.01); *G06F 3/044* (2013.01); *G06F 3/0416* (2013.01); *G06F 3/0412* (2013.01)

(58) Field of Classification Search
None
See application file for complete search history.

(56) References Cited

U.S. PATENT DOCUMENTS

| 2012/0092293 | A1  | 4/2012 | Ganapathi et al. |
| 2016/0077655 | A1* | 3/2016 | Oda ............... G06F 3/0416 345/174 |
| 2016/0196463 | A1* | 7/2016 | Jiang .............. G06F 3/044 348/77 |
| 2018/0032202 | A1* | 2/2018 | Kim .............. G06F 3/0412 |

FOREIGN PATENT DOCUMENTS

JP 2013-541780 A 11/2013

* cited by examiner

*Primary Examiner* — Joseph R Haley
(74) *Attorney, Agent, or Firm* — K&L Gates LLP

(57) ABSTRACT

According to an aspect, a detection device includes: a first detector and a second detector each configured to detect that an object is in contact therewith or in proximity thereto; a signal processor configured to perform signal processing on a detection signal output from the first detector and the second detector; and a selector configured to select one of the first detector and the second detector, and couple the selected one of the first detector and the second detector to the signal processor.

10 Claims, 21 Drawing Sheets

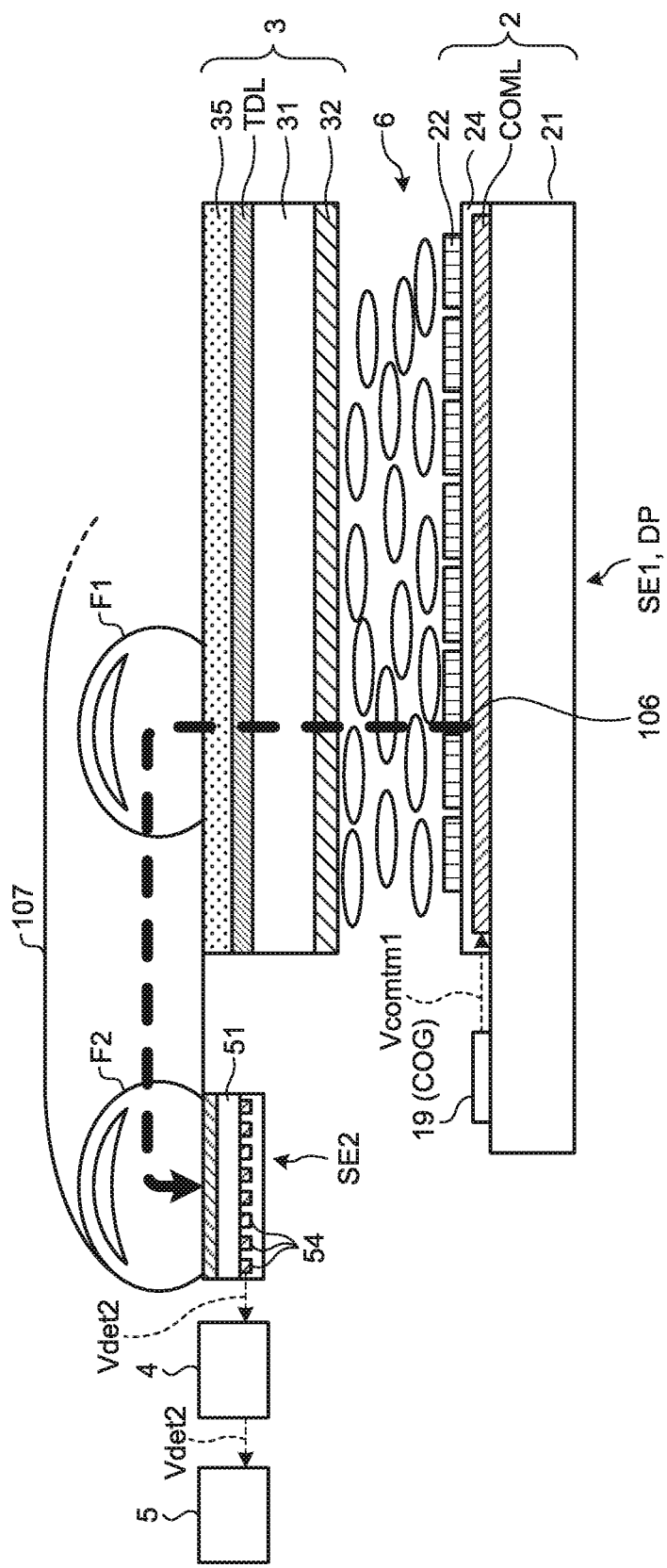

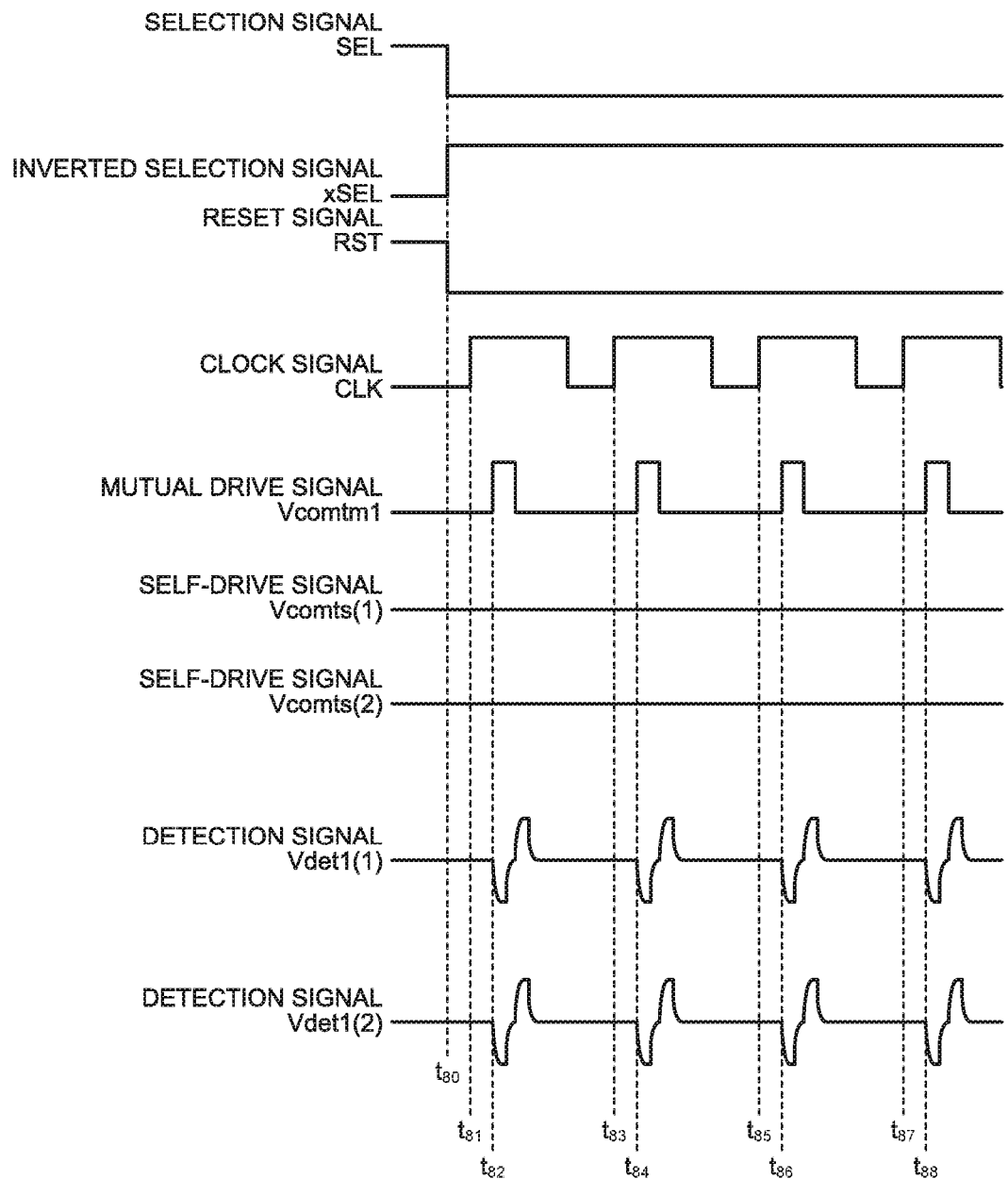

DETECTION DEVICE

CROSS-REFERENCE TO RELATED APPLICATIONS

This application claims priority from Japanese Application No. 2016-234238, filed on Dec. 1, 2016, the contents of which are incorporated by reference herein in its entirety.

BACKGROUND

1. Technical Field

The present disclosure relates to a detection device that can detect an external proximate object.

2. Description of the Related Art

A touch detection device capable of detecting an external proximate object, or a so-called touch panel, has recently been attracting attention. A touch panel is mounted on or integrated with a display device, such as a liquid crystal display device, which serves as a display device with a touch detection function. The display device with a touch detection function displays various kinds of button images and other images on the display device, thereby enabling a user to input information using the touch panel instead of typical mechanical buttons.

In addition to the technologies of the display device with a touch detection function, there has been developed an electronic apparatus including another detector. Another detector is used for detection of a fingerprint to cancel a sleep mode of the electronic apparatus, for example.

Japanese Unexamined Patent Application Publication No. 2013-541780 discloses a device having a first handwriting and touch sensor zone, a second handwriting and touch sensor zone, a first fingerprint sensor zone, and a second fingerprint sensor zone.

Downsizing of an electronic apparatus with a detection device including two detectors has been desired. To downsize the electronic apparatus, the detection device needs to be downsized.

For the foregoing reasons, there is a need for a detection device that can be downsized.

SUMMARY

According to an aspect, a detection device includes: a first detector and a second detector each configured to detect that an object is in contact therewith or in proximity thereto; a signal processor configured to perform signal processing on a detection signal output from the first detector and the second detector; and a selector configured to select one of the first detector and the second detector, and couple the selected one of the first detector and the second detector to the signal processor.

BRIEF DESCRIPTION OF THE DRAWINGS

FIG. 25 is a side view schematically illustrating the state where the object is in contact with or in proximity to the detection device according to the third embodiment; and FIG. 26 is a timing chart of an operation performed by the selector of the detection device according to the third embodiment.

DETAILED DESCRIPTION

Figure 1:
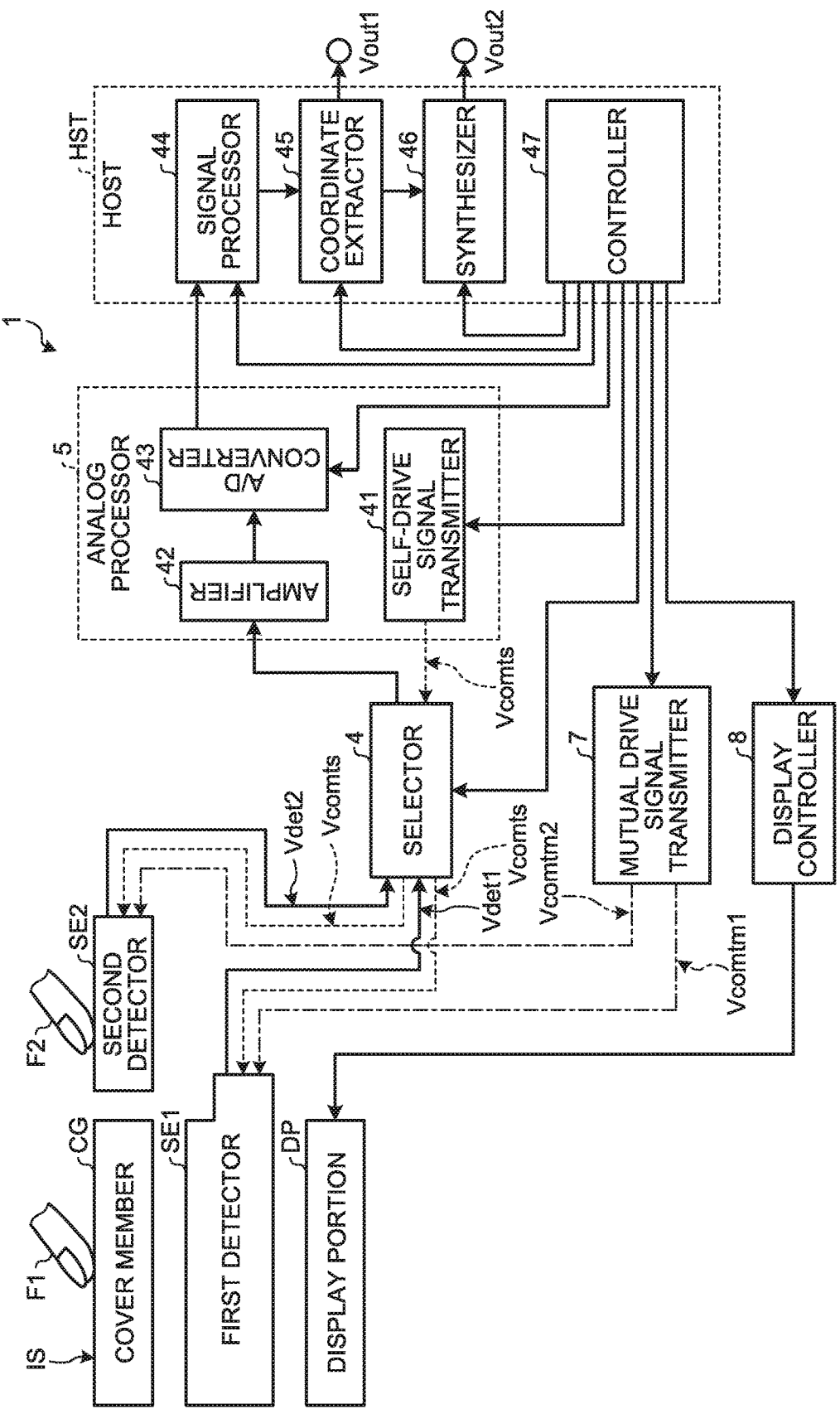
FIG. 1 is a block diagram illustrating a schematic configuration of a detection device according to an embodiment of the present disclosure.

Exemplary aspects (embodiments) to embody the present disclosure are described below in greater detail with reference to the accompanying drawings. The contents described in the embodiments below are not intended to limit the present disclosure. Components described below include components easily conceivable by those skilled in the art and components substantially identical therewith. Furthermore, the components described below can be appropriately combined. The disclosure is given by way of example only, and appropriate changes made without departing from the spirit of the invention and easily conceivable by those skilled in the art naturally fall within the scope of the invention. To simplify the explanation, the drawings may possibly illustrate the width, the thickness, the shape, and other elements of each portion more schematically than the actual aspect. These components, however, are given by way of example only and are not intended to limit interpretation of the present disclosure. In the specification and the figures, components similar to those previously described with reference to previous figures are denoted by like reference numerals, and detailed explanation thereof may be appropriately omitted. In this disclosure, when an element is described as being "on" another element, the element can be directly on the other element, or there can be one or more elements between the element and the other element.

Outline of the Configuration

FIG. 1 is a block diagram illustrating a schematic configuration of a detection device according to an embodiment of the present disclosure.

A detection device 1 includes a first detector SE1, a second detector SE2, a display portion DP, a selector 4, an analog processor 5, a mutual drive signal transmitter 7, a display controller 8, and a host HST.

The first detector SE1 detects contact or proximity of an object F1 with or to a detection surface IS of a cover member CG. Specifically, the first detector SE1 outputs detection signals Vdet1 according to contact or proximity of the object F1 with or to a plurality of regions overlapping with the surface IS in a direction perpendicular to the detection surface IS.

The object F1 may be a first type of an object that is deformable when being in contact with the detection surface IS, or a second type of an object that is not deformable or is relatively less deformable than the first kind of object when being in contact with the detection surface IS. Examples of the first kind of the object may include, but are not limited to, a finger. Examples of the second kind of the object may include, but are not limited to, a stylus pen made of resin or metal.

The number of objects that can be detected by the first detector SE1 is not limited to one. The first detector SE1 may detect two or more objects.

The object F1 according to the embodiment of the present disclosure is a finger. The first detector SE1 detects the position of contact or proximity (touch coordinates) of the finger F1 serving as the object.

The first detector SE1 is a sensor using a capacitance method, for example. The capacitance method is a mutual capacitance method or a self-capacitance method, for example.

The second detector SE2 detects contact or proximity of an object F2 with or to the second detector SE2. Specifically, the second detector SE2 outputs detection signals Vdet2 according to contact or proximity of the object F2 with or to a plurality of regions overlapping with a detection surface of the second detector SE2 in a direction perpendicular to the detection surface.

The object F2 may be the first type of an object that is deformable when being in contact with the second detector SE2 or the second type of an object that is not deformable or is relatively less deformable than the first type of the object when being in contact with the second detector SE2. Examples of the first kind of the object may include, but are not limited to, a finger. Examples of the second kind of the object may include, but are not limited to, a stylus pen made of resin or metal.

The number of objects that can be detected by the second detector SE2 is not limited to one. The second detector SE2 may detect two or more objects.

Assume that the object F2 according to the embodiment of the present disclosure is a finger, and the second detector SE2 detects a fingerprint of the finger F2 serving as the object.

The second detector SE2 is a sensor using the capacitance method, for example. The capacitance method is the mutual capacitance method or the self-capacitance method, for example.

The display portion DP displays an image toward the detection surface IS. Examples of the display portion DP include, but are not limited to, a liquid crystal display device, and an organic electro-luminescence (EL) display device.

The first detector SE1 and the display portion DP may be a so-called in-cell device in which they are integrated with each other. Alternatively, the first detector SE1 and the display portion DP may be a so-called on-cell device in which the first detector SE1 is mounted on the display portion DP. Integrating the first detector SE1 and the display portion DP with each other includes a case where part of members, such as substrates and electrodes, are shared by the display portion DP and the first detector SE1, for example.

The display controller 8 causes the display portion DP to display an image in accordance with control signals supplied from a controller 47 in the host HST.

In a case where the first detector SE1 is a sensor using the mutual capacitance method, the mutual drive signal transmitter 7 outputs, to the first detector SE1, mutual drive signals Vcomtm1 for mutual capacitance detection in accordance with control signals supplied from the controller 47 in the host HST. In response to the supply of the mutual drive signals Vcomtm1, the first detector SE1 outputs, to the selector 4, detection signals Vdet1 based on the principle of the mutual capacitance detection, which will be described later.

In a case where the second detector SE2 is a sensor using the mutual capacitance method, the mutual drive signal transmitter 7 outputs, to the second detector SE2, mutual drive signals Vcomtm2 for mutual capacitance detection in accordance with control signals supplied from the controller 47 in the host HST. In response to the supply of the mutual drive signals Vcomtm2, the second detector SE2 outputs, to the selector 4, detection signals Vdet2 based on the principle of the mutual capacitance detection, which will be described later.

The selector 4 selects one of the first detector SE1 and the second detector SE2 in accordance with control signals supplied from the controller 47 in the host HST. The selector 4 electrically couples the selected one of the first detector SE1 and the second detector SE2 to the analog processor 5. The analog processor 5 includes a self-drive signal transmitter 41.

In a case where the first detector SE1 is a sensor using the self-capacitance method, the self-drive signal transmitter 41 outputs, to the selector 4, self-drive signals Vcomts for self-capacitance detection in accordance with control signals supplied from the controller 47 in the host HST. The selector 4 selects the first detector SE1 in accordance with the control signals supplied from the controller 47 in the host HST, and outputs the self-drive signals Vcomts to the first detector SE1. In response to the supply of the self-drive signals Vcomts, the first detector SE1 outputs, to the selector 4, the detection signals Vdet1 based on the principle of the self-capacitance detection, which will be described later. The selector 4 outputs the detection signals Vdet1 output from the first detector SE1 to the analog processor 5.

In a case where the second detector SE2 is a sensor using the self-capacitance method, the self-drive signal transmitter 41 outputs, to the selector 4, self-drive signals Vcomts for self-capacitance detection in accordance with control signals supplied from the controller 47 in the host HST. The selector 4 selects the second detector SE2 in accordance with the control signals supplied from the controller 47 in the host HST, and outputs the self-drive signals Vcomts to the second detector SE2. In response to the supply of the self-drive signals Vcomts, the second detector SE2 outputs, to the selector 4, the detection signals Vdet2 based on the principle of the self-capacitance detection, which will be described later. The selector 4 outputs the detection signals Vdet2 output from the second detector SE2 to the analog processor 5.

The detection methods employed by the first detector SE1 and the second detector SE2 may include the following four cases: the first detector SE1 employs the mutual capacitance method, and the second detector SE2 employs the mutual capacitance method; the first detector SE1 employs the mutual capacitance method, and the second detector SE2 employs the self-capacitance method; the first detector SE1 employs the self-capacitance method, and the second detector SE2 employs the mutual capacitance method; and the first detector SE1 employs the self-capacitance method, and the second detector SE2 employs the self-capacitance method.

In a case where both of the first detector SE1 and the second detector SE2 are sensors using the self-capacitance method, the mutual drive signal transmitter 7 is not required.

In a case where both of the first detector SE1 and the second detector SE2 are sensors using the mutual capacitance method, the self-drive signal transmitter 41 is not required.

The analog processor 5 is a signal processing circuit that performs analog signal processing on the detection signals Vdet1 and Vdet2. The analog processor 5 includes an amplifier 42. The amplifier 42 amplifies the detection signals Vdet1 or Vdet2 supplied from the selector 4. The amplifier 42 may include an analog low-pass filter (LPF) serving as a low-pass analog filter that removes high-frequency components (noise components) included in the detection signals Vdet1 or Vdet2 and outputs the resultant signals. The analog processor 5 may include the respective amplifiers 42 for the detection signals Vdet1 and Vdet2. In other words, the analog processor 5 may include a plurality of amplifiers 42.

The analog processor 5 includes an analog/digital (A/D) converter 43. The A/D converter 43 samples analog signals supplied from the amplifier 42 at a timing in accordance with control signals supplied from the controller 47 in the host HST, thereby converting the analog signals into digital signals.

The host HST includes a signal processor 44, a coordinate extractor 45, and a synthesizer 46 besides the controller 47.

The signal processor 44 includes a digital filter that reduces noise components included in output signals from the A/D converter 43. The signal processor 44 is a logic circuit that determines whether the object F1 is in contact with or in proximity to the first detector SE1 or whether the object F2 is in contact with or in proximity to the second detector SE2 in accordance with the output signals from the A/D converter 43.

The coordinate extractor 45 is a logic circuit that derives detection coordinates Vout1 when contact or proximity of a finger is detected by the signal processor 44. If the first detector SE1 is selected, the coordinate extractor 45 outputs the detection coordinates Vout1 to the outside.

If the second detector SE2 is selected, the synthesizer 46 generates two-dimensional information Vout2 indicating the shape of the object F2 in contact with or in proximity to the second detector SE2, that is, a fingerprint, in accordance with the detection signals Vdet2 output from the second detector SE2. The synthesizer 46 outputs the two-dimensional information Vout2 to the outside.

Basic Principle of Detection

The first detector SE1 and the second detector SE2 operate based on the basic principle of the mutual capacitance detection or the self-capacitance detection.

Figure 2:
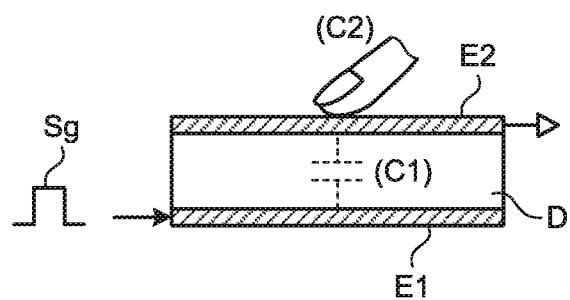
FIG. 2 is a diagram for explaining an example of capacitance generated in a touch detection device.
Figure 3:
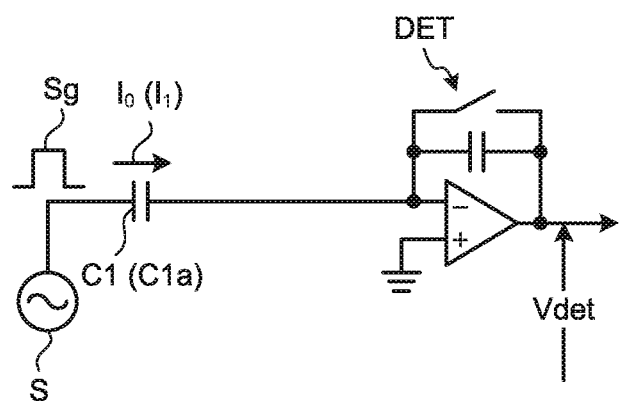
FIG. 3 is a diagram for explaining an example of an equivalent circuit of the touch detection device.
Figure 4:
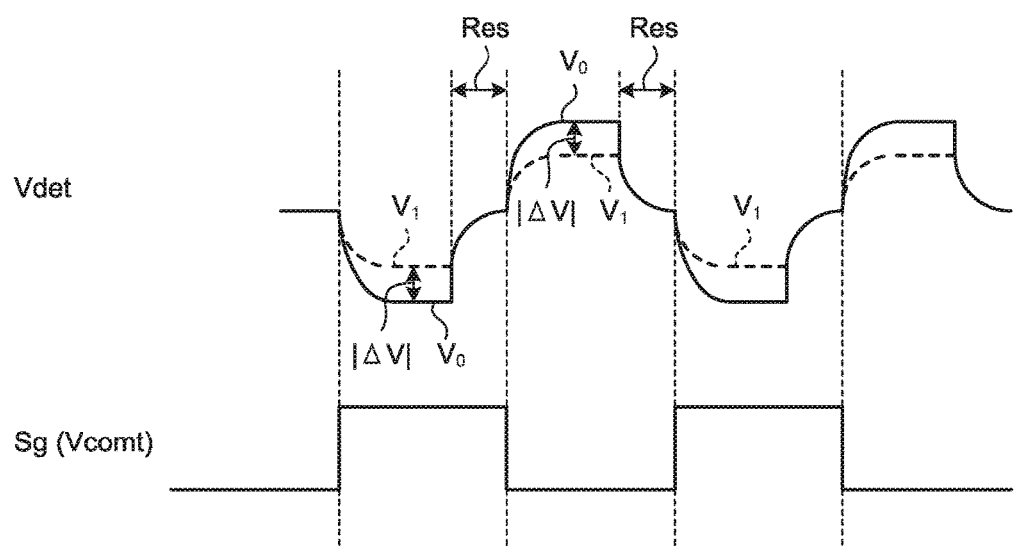
FIG. 4 is a diagram illustrating an example of waveforms of a drive signal and a touch detection signal.

The following describes the basic principle of the mutual capacitance detection with reference to FIGS. 2 to 4.

FIG. 2 is a diagram for explaining an example of capacitance generated in a touch detection device. FIG. 3 is a diagram for explaining an example of an equivalent circuit of the touch detection device. FIG. 4 is a diagram illustrating an example of waveforms of a drive signal and a touch detection signal. FIG. 3 also illustrates a detection circuit.

As illustrated in FIG. 2, for example, a capacitance element C1 includes a pair of electrodes, that is, a drive electrode E1 and a touch detection electrode E2 facing each other with a dielectric D interposed therebetween. As illustrated in FIG. 3, one end of the capacitance element C1 is coupled to an alternating-current (AC) signal source (drive signal source) S, and the other end thereof is coupled to a voltage detector (touch detector) DET. The voltage detector DET is an integration circuit included in the amplifier 42 illustrated in FIG. 1, for example.

When the AC signal source S applies an AC rectangular wave Sg at a predetermined frequency (e.g., approximately several kilohertz to several hundred kilohertz) to the drive electrode E1 (one end of the capacitance element C1), an output waveform (touch detection signal Vdet) appears via the voltage detector DET coupled to the touch detection electrode E2 (the other end of the capacitance element C1). The AC rectangular wave Sg corresponds to the mutual drive signals Vcomtm1 and Vcomtm2.

In a state where an object is neither in contact with (nor in proximity to) the touch detection electrode E2 (non-contact state), an electric current $I_0$ according to the capacitance value of the capacitance element C1 flows in association with charge and discharge of the capacitance element C1. As illustrated in FIG. 4, the voltage detector DET converts fluctuations in the electric current $I_0$ according to the AC rectangular wave Sg into fluctuations in the voltage (waveform $V_0$ indicated by the solid line).

By contrast, in a state where an object is in contact with (or in proximity to) the touch detection electrode E2 (contact state), a capacitance C2 generated by a finger is in contact with or in proximity to the touch detection electrode E2, as illustrated in FIG. 2. As a result, a fringe capacitance between the drive electrode E1 and the touch detection electrode E2 is blocked by the capacitance C2, as illustrated in FIG. 2, and the capacitance element C1 acts as a capacitance element C1a having a capacitance value smaller than that of the capacitance element C1. As illustrated in the equivalent circuit in FIG. 3, an electric current $I_1$ flows through the capacitance element C1a.

As illustrated in FIG. 4, the voltage detector DET converts fluctuations in the electric current $I_1$ according to the AC rectangular wave Sg into fluctuations in the voltage (waveform $V_1$ indicated by the dotted line). In this case, the waveform $V_1$ has amplitude smaller than that of the waveform $V_0$. Consequently, an absolute value $|\Delta V|$ of a voltage difference between the waveform $V_0$ and the waveform $V_1$ varies according to the influence made by the object. More preferably, the voltage detector DET performs an operation with a period Reset to reset charging and discharging of a capacitor in accordance with the frequency of the AC rectangular wave Sg by performing switching in the circuit, so as to accurately detect the absolute value $|\Delta V|$ of the voltage difference between the waveform $V_0$ and the waveform $V_1$.

The following describes the basic principle of the self-capacitance detection with reference to FIGS. 5 to 8.

Figure 5:
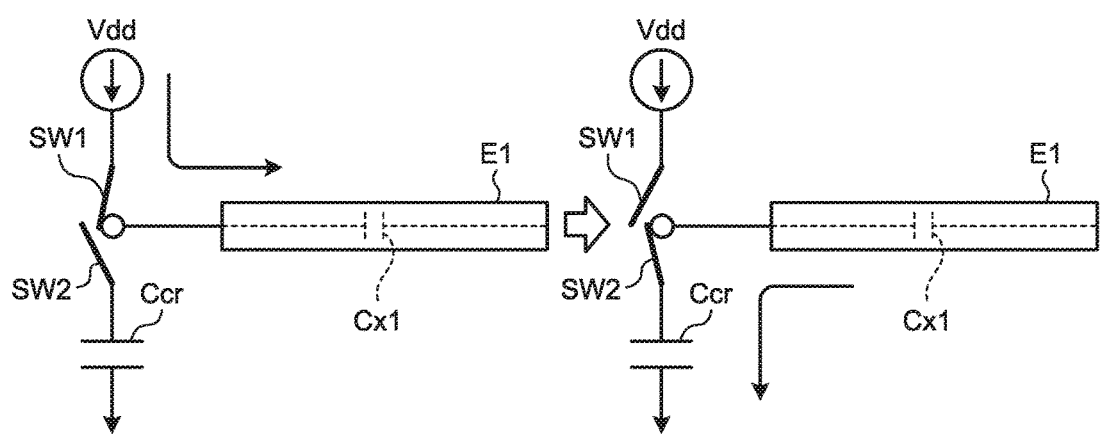
FIG. 5 is a diagram illustrating a state where an object is neither in contact with nor in proximity to a touch detection device for explaining the basic principle of self-capacitance detection.
Figure 6:
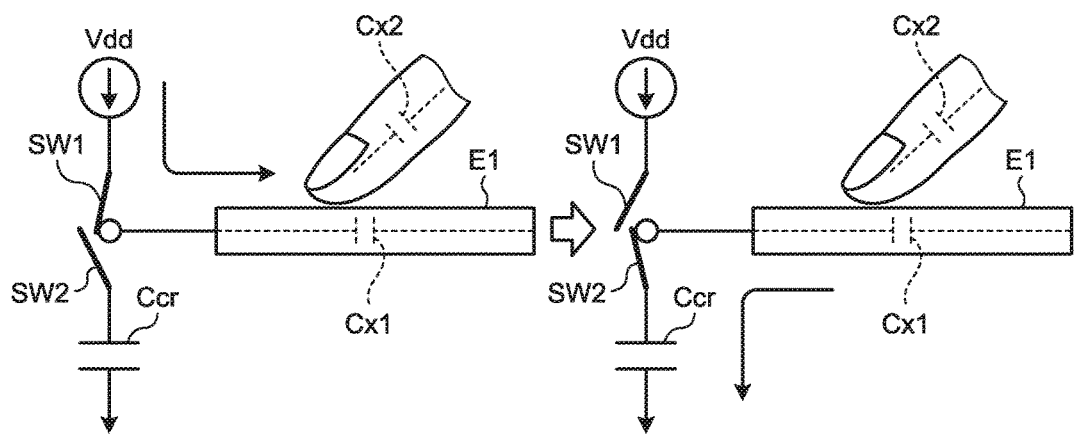
FIG. 6 is a diagram illustrating a state where an object is in contact with or in proximity to the touch detection device for explaining the basic principle of the self-capacitance detection.
Figure 7:
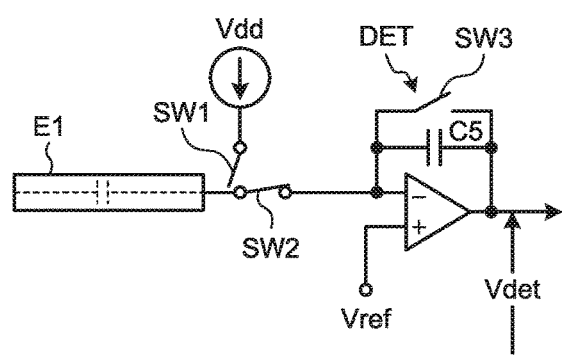
FIG. 7 is a diagram for explaining an example of an equivalent circuit in the self-capacitance detection.
Figure 8:
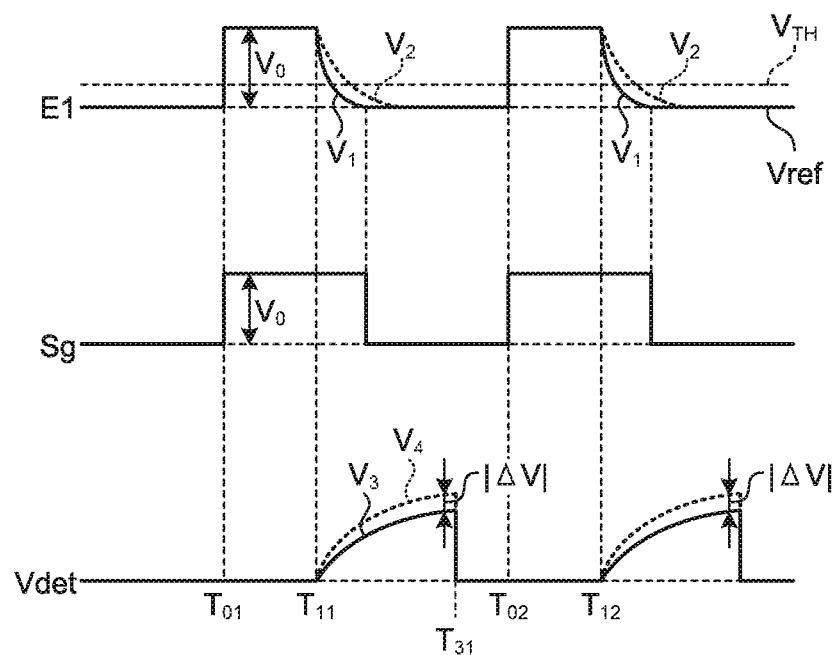
FIG. 8 is a diagram of an example of waveforms of a drive signal and a detection signal in the self-capacitance touch detection.

FIG. 5 is a diagram illustrating a state where an object is neither in contact with nor in proximity to a touch detection device for explaining the basic principle of the self-capacitance detection. FIG. 6 is a diagram illustrating a state where an object is in contact with or in proximity to the touch detection device for explaining the basic principle of the self-capacitance detection. FIG. 7 is a diagram for explaining an example of an equivalent circuit in the self-capacitance detection. FIG. 8 is a diagram illustrating an example of waveforms of a drive signal and a detection signal in the self-capacitance touch detection.

In the left part of FIG. 5, in a state where an object is neither in contact with nor in proximity to the detection electrode E1, a detection electrode E1 is coupled to a power source Vdd by a switch SW1 but not coupled to a capacitor Ccr by a switch SW2. In this state, a capacitance Cx1 included in the detection electrode E1 is charged. In the right part of FIG. 5, the power source Vdd is uncoupled from the detection electrode E1 by the switch SW1, and the detection electrode E1 is coupled to the capacitor Ccr by the switch SW2. In this state, the capacitance Cx1 is discharged via the capacitor Ccr.

In the left part of FIG. 6, in a state where an object is in contact with or in proximity to the detection electrode E1, the detection electrode E1 is coupled to the power source Vdd by the switch SW1 but not coupled to the capacitor Ccr by the switch SW2. In this state, a capacitance Cx2 generated by the object in proximity to the detection electrode E1 is charged in addition to the capacitance Cx1 included in the detection electrode E1. In the right part of FIG. 6, the power source Vdd is uncoupled from the detection electrode E1 by the switch SW1, and the detection electrode E1 is coupled to the capacitor Ccr by the switch SW2. In this state, the capacitance Cx1 and the capacitance Cx2 are discharged via the capacitor Ccr.

The voltage change characteristics of the capacitor Ccr at the time of discharge (the state where the object is in contact with or in proximity to the detection electrode E1) illustrated in the right part of FIG. 6 are clearly different from those of the capacitor Ccr at the time of discharge (the state where the object is neither in contact with nor in proximity to the detection electrode E1) illustrated in the right part of FIG. 5 due to the presence of the capacitance Cx2. The self-capacitance method determines whether the object is in contact with or in proximity to the detection electrode E1 by utilizing the difference in the voltage change characteristics caused by the presence or absence of the capacitance Cx2.

Specifically, an AC rectangular wave Sg (refer to FIG. 8) at a predetermined frequency (e.g., approximately several kilohertz to several hundred kilohertz) is applied to the detection electrode E1. The voltage detector DET illustrated in FIG. 7 converts fluctuations in the electric current according to the AC rectangular wave Sg into fluctuations in the voltage (waveforms $V_3$ and $V_4$). The voltage detector DET is an integration circuit included in the amplifier 42 illustrated in FIG. 1, for example.

As described above, the detection electrode E1 can be uncoupled from the power source Vdd and the capacitor Ccr by the switch SW1 and the switch SW2, respectively. As illustrated in FIG. 8, the AC rectangular wave Sg rises to the voltage level corresponding to a voltage $V_0$ at time $T_{01}$. At this time, the switch SW1 is turned ON, and the switch SW2 is turned OFF. As a result, the voltage level of the detection electrode E1 also rises to the voltage $V_0$.

Subsequently, the switch SW1 is turned OFF before time $T_{11}$. While the detection electrode E1 is in a floating state at this time, the electric potential of the detection electrode E1 is maintained at $V_0$ due to the capacitance Cx1 (refer to FIG. 5) of the detection electrode E1 or the capacitance (Cx1+Cx2, refer to FIG. 6) obtained by adding the capacitance Cx2 generated by the object in contact with or in proximity to the detection electrode E1 to the capacitance Cx1 of the detection electrode E1. Subsequently, a switch SW3 is turned ON before time $T_{11}$ and turned OFF after a predetermined time has elapsed, thereby resetting the voltage detector DET. This reset operation makes an output voltage Vdet from the voltage detector DET substantially equal to a reference voltage Vref.

Subsequently, when the switch SW2 is turned ON at time $T_{11}$, a voltage of an inversion input portion of the voltage detector DET rises to the voltage $V_0$ equal to that of the detection electrode E1. Subsequently, the voltage of the inversion input portion of the voltage detector DET falls to the reference voltage Vref in accordance with a time constant of the capacitance Cx1 (or Cx1+Cx2) of the detection electrode E1 and a capacitance C5 in the voltage detector DET. At this time, the electric charge accumulated in the capacitance Cx1 (or Cx1+Cx2) of the detection electrode E1 moves to the capacitance C5 in the voltage detector DET. As a result, the output voltage Vdet from the voltage detector DET increases.

When the object is not in proximity to the detection electrode E1, the output voltage Vdet from the voltage detector DET is represented by a waveform $V_3$ indicated by the solid line, and Vdet=Cx1×$V_0$/C5 is satisfied. When the capacitance generated by the influence of the object is added, the output voltage Vdet from the voltage detector DET is represented by a waveform $V_4$ indicated by the dotted line, and Vdet=(Cx1+Cx2)×$V_0$/C5 is satisfied.

Subsequently, at time $T_{31}$ after the electric charge in the capacitance Cx1 (or Cx1+Cx2) of the detection electrode E1 sufficiently moves to the capacitance C5, the switch SW2 is turned OFF, and the switches SW1 and SW3 are turned ON. As a result, the electric potential of the detection electrode E1 is reduced to a low level equal to that of the AC rectangular wave Sg, and the voltage detector DET is reset. The timing to turn ON the switch SW1 may be any timing as long as it is after the switch SW2 is turned OFF and before time $T_{O2}$. The timing to reset the voltage detector DET may be any timing as long as it is after the switch SW2 is turned OFF and before time $T_{12}$.

The operation described above is repeated at a predetermined frequency (e.g., approximately several kilohertz to several hundred kilohertz). The touch detection device thus can determine whether the object is present (whether a touch is made) based on the absolute value $|\Delta V|$ of the difference between the waveform $V_3$ and the waveform $V_4$. As illustrated in FIG. 8, when the object is not in proximity to the detection electrode E1, the electric potential of the detection electrode E1 is represented by the waveform $V_1$. By contrast, when the capacitance Cx2 generated by the influence of the object is added, the electric potential of the detection electrode E1 is represented by a waveform $V_2$. The touch detection device may determine whether an external proximate object is present (whether a touch is made) by measuring time until when the waveforms $V_1$ and $V_2$ fall to a predetermined threshold voltage $V_{TH}$.

Figure 9:
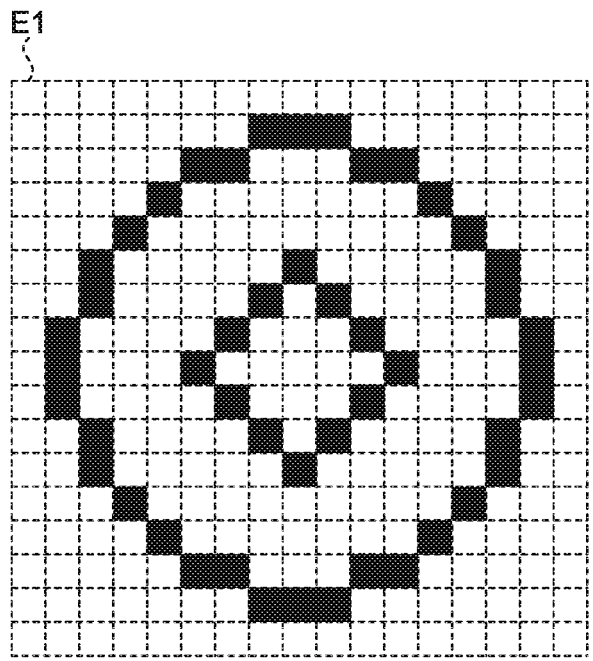
FIG. 9 is a diagram schematically illustrating a mechanism of fingerprint detection performed by a synthesizer.

FIG. 9 is a diagram schematically illustrating a mechanism of fingerprint detection performed by the synthesizer. The synthesizer 46 combines the detection signals Vdet2 received from a plurality of detection electrodes E1, thereby generating two-dimensional information indicating the shape of an object in contact with or in proximity to the detection electrodes E1. Specifically, the synthesizer 46, for example, generates a two-dimensional image that shows a difference in detection intensity corresponding to a difference in intensity of contact with the second detector SE2 (refer to FIG. 1), which is caused by unevenness on an object (e.g., a person's finger), as shades of color (e.g., a gray scale). The output signals Vout2 from the host HST including the synthesizer 46 corresponds to output signals of the two-dimensional information described above, for example.

To simplify the explanation, FIG. 9 illustrates two-gradation detection merely indicating whether the object is in contact with or in proximity to the second detector SE2 as an example, but a detection result in each block can be represented by a multi-gradation image in the actual configuration. In FIG. 9, the object is an object having a double circular protrusion. In a case where the object is a person's finger having a fingerprint, the fingerprint is detected as the two-dimensional information. The functions of the synthesizer 46 may be included in a component other than the host HST. An external component, for example, may generate the two-dimensional information in accordance with the output signals Vout1 from the coordinate extractor 45. The generation of the two-dimensional information may be performed by a hardware component, such as a circuit, or may be performed by software processing.

First Embodiment

Figure 10:
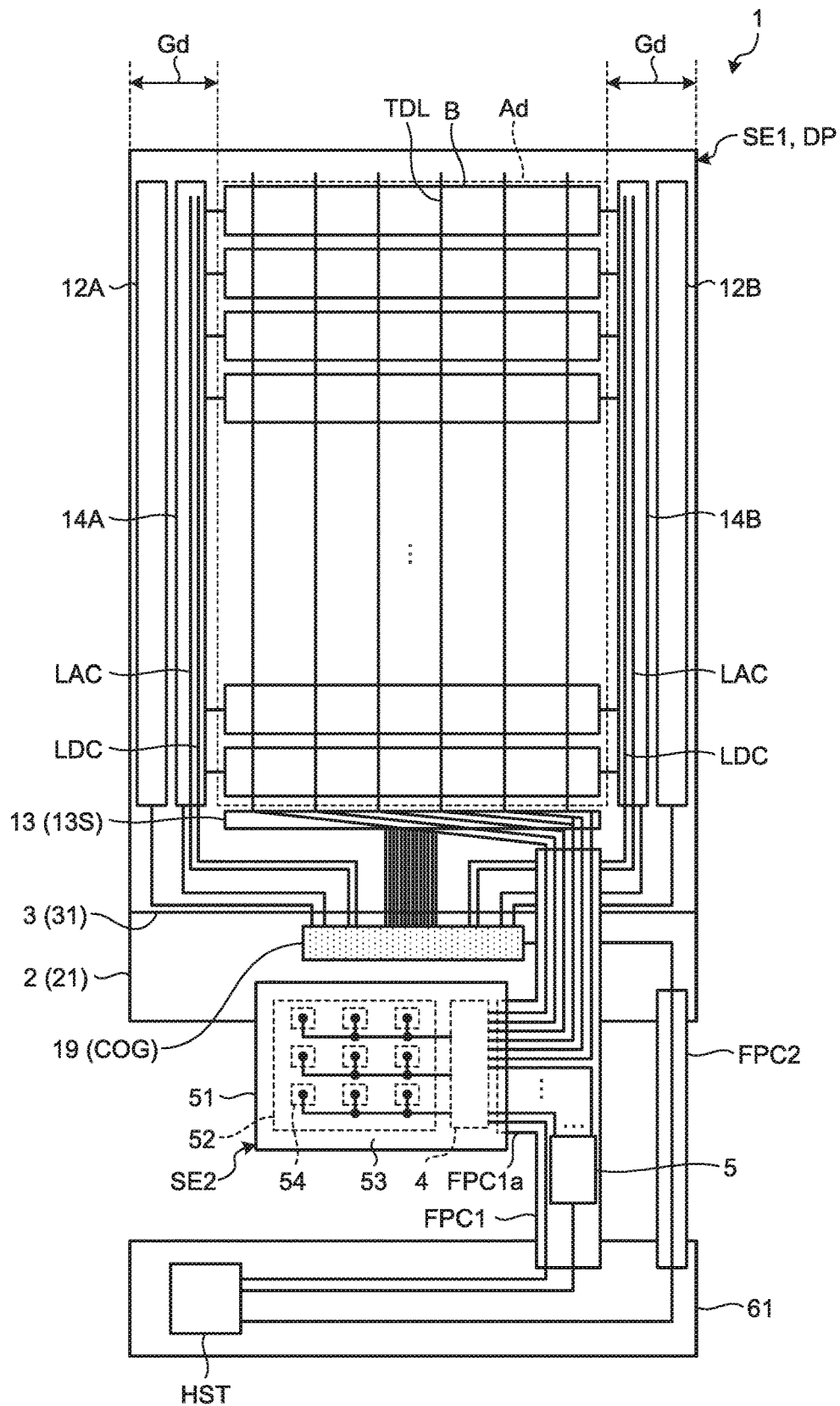
FIG. 10 is a diagram illustrating an exemplary configuration of the detection device according to a first embodiment of the present disclosure.

FIG. 10 is a diagram illustrating an exemplary configuration of the detection device according to a first embodiment of the present disclosure. The first detector SE1 according to the first embodiment is a sensor using the mutual capacitance method. The first detector SE1 and the display portion DP are integrated with each other to constitute a so-called in-cell device. The second detector SE2 is a sensor using the self-capacitance method.

The display portion DP of the detection device 1 includes a first substrate (e.g., a pixel substrate 2) and a second substrate (e.g., a counter substrate 3). The pixel substrate 2 includes a first insulating substrate (e.g., a TFT substrate 21). The counter substrate 3 includes a second insulating substrate 31. The TFT substrate 21 and the second insulating substrate 31 are glass substrates or film substrates, for example. A drive IC chip (e.g., a chip on glass (COG) 19) is mounted on the TFT substrate 21. The pixel substrate 2 (TFT substrate 21) has a display region Ad of the display portion DP and a frame Gd.

The COG 19 is an IC chip that is a driver mounted on the TFT substrate 21, and serves as a control device including circuits required for driving the display portion DP, such as the display controller 8 illustrated in FIG. 1. Because the thirst detector is a sensor using the mutual capacitance method, the COG 19 also serves as a control device including circuits required for driving the first detector SE1, such as the mutual drive signal transmitter 7 illustrated in FIG. 1.

The COG 19 is coupled to the host HST mounted on a substrate 61 via a printed circuit board FPC2 provided between the TFT substrate 21 and the substrate 61. The printed circuit board FPC2 and the substrate 61 may be flexible printed circuit boards, rigid circuit boards, or rigid flexible circuit boards. The COG 19 drives the first detector SE1 and the display portion DP in accordance with control signals supplied from the host HST.

Gate drivers 12A and 12B have a function to sequentially select each one horizontal line to be a target of display drive performed by the display portion DP in accordance with control signals supplied from the COG 19.

A source driver 13 is a circuit that supplies pixel signals Vpix to pixels Pix (sub-pixels SPix), which will be described later, of the display portion DP in accordance with control signals supplied from the COG 19. The source driver 13 is supplied with 6-bit image signals Vsig of red (R), green (G), and blue (B), for example.

The source driver 13 receives the image signals Vsig from the COG 19 and supplies them to a source selector 13S. The source driver 13 generates switch control signals Vsel required for separating the pixel signals Vpix multiplexed with the image signals Vsig, and supplies the switch control signals to the source selector 13S together with the pixel signals Vpix. Providing the source selector 13S can reduce the number of wires between the source driver 13 and the COG 19. The source selector 13S is not necessarily provided. Part of control performed by the source driver 13 may be performed by the COG 19, and only the source selector 13S may be provided.

Drive electrode drivers 14A and 14B are circuits that supply mutual drive signals Vcomtm1 for the mutual capacitance detection and a drive voltage VcomDC for display to drive electrodes COML, which will be described later, of the display portion DP in accordance with control signals supplied from the COG 19.

In the detection device 1, the COG 19 may include circuits, such as the drive electrode drivers 14A and 14B, and the gate drivers 12A and 12B. The COG 19 is merely one example of implementation, and the present disclosure is not limited thereto. A component having the same functions as those of the COG 19 may be mounted on the printed circuit board FPC2 as a chip on film or a chip on flexible (COF), for example.

As illustrated in FIG. 10, drive electrode blocks B of the drive electrodes COML three-dimensionally intersect with touch detection electrodes TDL in a direction perpendicular to the surface of the TFT substrate 21.

The drive electrodes COML are a plurality of stripe electrode patterns extending in one direction. To perform a touch detection operation, the drive electrode drivers 14A and 14B sequentially supply the mutual drive signals Vcomtm1 to the electrode patterns. The drive electrode block B illustrated in FIG. 10 corresponds to a plurality of stripe electrode patterns of the drive electrodes COML simultaneously supplied with the mutual drive signals Vcomtm1.

The drive electrode blocks B (drive electrodes COML) extend in a direction parallel with the short side of the first detector SE1. The touch detection electrodes TDL, which will be described later, extend in a direction intersecting with the extending direction of the drive electrode blocks B. The touch detection electrodes TDL extend in a direction parallel with the long side of the first detector SE1, for example.

The source selector 13S includes TFT elements, and is formed near the display region Ad on the TFT substrate 21. A multitude of pixels Pix, which will be described later, are arranged in the display region Ad in a matrix (row-column configuration). The frame Gd is a region in which no pixel Pix is arranged when viewed in the direction perpendicular to the surface of the TFT substrate 21. The gate drivers 12A and 12B, and the drive electrode drivers 14A and 14B are arranged in the frame Gd.

The gate drivers 12A and 12B include TFT elements, and are formed on the TFT substrate 21. The gate drivers 12A and 12B sandwich the display region Ad in which the sub-pixels Spix (pixels) described later are arranged in a matrix (row-column configuration) so as to drive the sub-pixels Spix (pixels) from both sides of the display region Ad. Scanning lines are arrayed between the gate driver 12A and the gate driver 12B. In other words, the scanning lines extend in a direction parallel with the extending direction of the drive electrodes COML when viewed in the direction perpendicular to the surface of the TFT substrate 21.

While the present configuration example includes two circuits of the gate drivers 12A and 12B, this is merely one example of a specific configuration of the gate driver, and the preset disclosure is not limited thereto. The gate driver may be one circuit provided at only one end of the scanning lines, for example.

The drive electrode drivers 14A and 14B include TFT elements, and are formed on the TFT substrate 21. The drive electrode drivers 14A and 14B are supplied, from the COG 19, with the drive voltage VcomDC for display via display wiring LDC, and with the mutual drive signals Vcomtm1 for the mutual capacitance detection via touch wiring LAC.

The drive electrode drivers 14A and 14B can drive each of the drive electrode blocks B arranged side by side, from both sides of each drive electrode block B. The display wiring LDC that supplies the drive voltage VcomDC for display and the touch wiring LAC that supplies the mutual drive signals Vcomtm1 for the mutual capacitance detection are arranged in parallel in the frames Gd. The display wiring LDC is arranged closer to the display region Ad than the touch wiring LAC is.

With this configuration, the drive voltage VcomDC for display supplied by the display wiring LDC stabilizes the potential state at the ends of the display region Ad. Especially, the configuration stabilizes display in a liquid crystal display device including liquid crystals in a lateral electric field mode.

While the present configuration example includes two circuits of the drive electrode drivers 14A and 14B, this is merely one example of a specific configuration of the drive electrode driver, and the present disclosure is not limited thereto. The drive electrode driver may be one circuit provided at only one end of the drive electrode blocks B, for example.

The first detector SE1 outputs the touch detection signals Vdet1 from the short side thereof. This configuration facilitates routing of the wiring to couple the first detector SE1 to the selector 4 via a printed circuit board FPC1 serving as a terminal.

Figure 11:
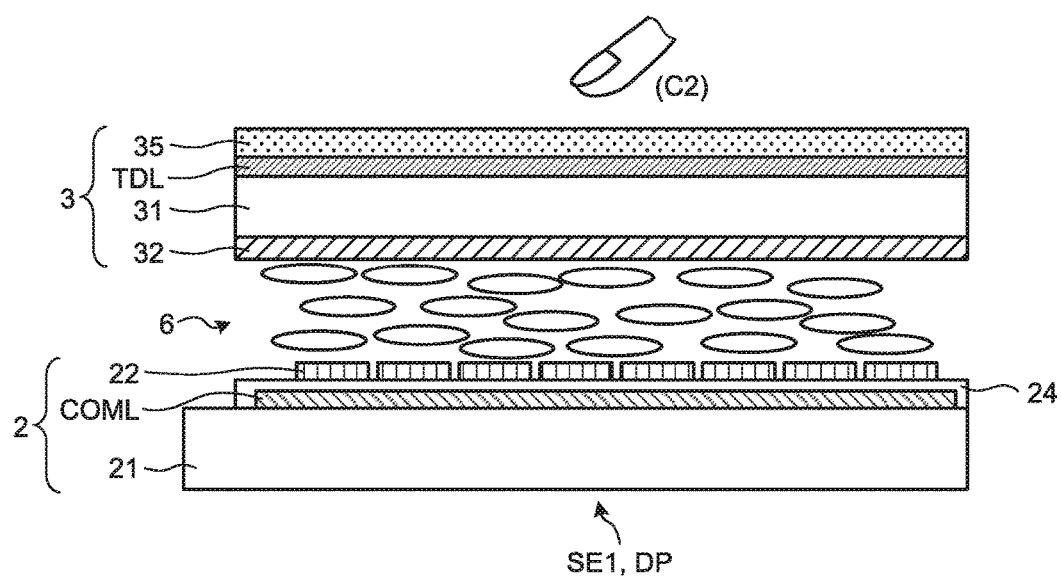
FIG. 11 is a sectional view illustrating a schematic sectional structure of a first detector and a display portion of the detection device according to the first embodiment.
Figure 12:
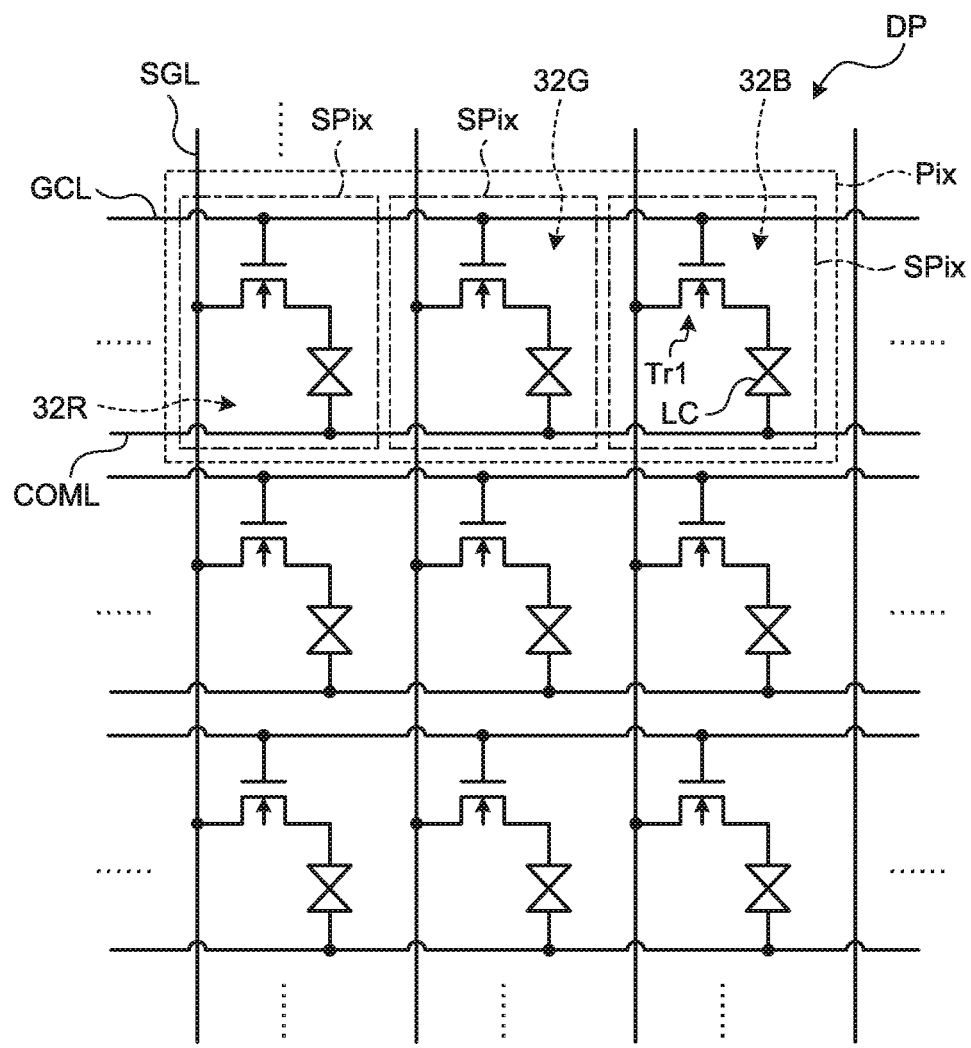
FIG. 12 is a circuit diagram illustrating a pixel array in the display portion of the detection device according to the first embodiment.

FIG. 11 is a sectional view illustrating a schematic sectional structure of the first detector and the display portion of the detection device according to the first embodiment. FIG. 12 is a circuit diagram illustrating a pixel array in the display portion of the detection device according to the first embodiment. The first detector SE1 and the display portion DP include the pixel substrate 2, the second substrate (e.g., the counter substrate 3), and a display functional layer (e.g., a liquid crystal layer 6). The counter substrate 3 faces the pixel substrate 2 in the direction perpendicular to the surface of the pixel substrate 2. The liquid crystal layer 6 is interposed between the pixel substrate 2 and the counter substrate 3.

The pixel substrate 2 includes the TFT substrate 21, a plurality of pixel electrodes 22, a plurality of drive electrodes COML, and an insulating layer 24. The TFT substrate 21 serves as a circuit board. The pixel electrodes 22 are arranged in a matrix (row-column configuration) on the TFT substrate 21. The drive electrodes COML are formed between the TFT substrate 21 and the pixel electrodes 22. The insulating layer 24 insulates the pixel electrodes 22 from the drive electrodes COML.

TFT elements Tr of the respective sub-pixels SPix illustrated in FIG. 12, and wiring including pixel signal lines SGL and scanning signal lines GCL are formed on the TFT substrate 21. The pixel signal lines SGL supply the pixel signals Vpix to the respective pixel electrodes 22 illustrated in FIG. 11, and the scanning signal lines GCL drive the TFT elements Tr. The pixel signal lines SGL extend on a plane parallel with the surface of the TFT substrate 21, and supply the pixel signals Vpix for displaying an image to the sub-pixels SPix. Each sub-pixel SPix serves as a constituent unit controlled by the pixel signal Vpix. Each sub-pixel SPix is a region surrounded by the pixel signal lines SGL and the scanning signal lines GCL, and serves as a constituent unit controlled by the TFT element Tr.

As illustrated in FIG. 12, the display portion DP includes a plurality of sub-pixels SPix arranged in a matrix (row-column configuration). The sub-pixels SPix each include a TFT element Tr1 and a liquid crystal element LC. The TFT element Tr1 is a thin-film transistor, and is an n-channel metal oxide semiconductor (MOS) TFT in this example.

One of the source and the drain of the TFT element Tr1 is coupled to the pixel signal line SGL, the gate thereof is coupled to the scanning signal line GCL, and the other of the source and the drain thereof is coupled to one end of the liquid crystal element LC. The one end of the liquid crystal element LC is coupled to the drain of the TFT element Tr1, and the other end thereof is coupled to the drive electrode COML, for example. The drive electrodes COML, the insulating layer 24, and the pixel electrodes 22 are sequentially stacked on the TFT substrate 21 in FIG. 11, but the present disclosure is not limited thereto. The stacking order on the TFT substrate 21 may be the pixel electrodes 22, the insulating later 24, and the drive electrodes COML. Alternatively, the drive electrodes COML and the pixel electrodes 22 may be disposed in the same layer with the insulating later 24 interposed therebetween.

The sub-pixel SPix is coupled to the other sub-pixels SPix belonging to the same row in the display portion DP by the scanning signal line GCL. The scanning signal lines GCL are coupled to the gate drivers 12A and 12B, and are supplied with the scanning signals Vscan from the gate drivers 12A and 12B.

The sub-pixel SPix is coupled to the other sub-pixels SPix belonging to the same column in the display portion DP by the pixel signal line SGL. The pixel signal lines SGL are coupled to the source driver 13 and supplied with the pixel signals Vpix from the source driver 13.

The sub-pixel SPix is also coupled to the other sub-pixels SPix belonging to the same row in the display portion DP by the drive electrode COML. The drive electrodes COML are coupled to the drive electrode drivers 14A and 14B, and are supplied with the drive signals Vcom from the drive electrode drivers 14A and 14B. In other words, one drive electrode COML is shared by a plurality of sub-pixels SPix belonging to the same row, in this example.

The extending direction of the drive electrodes COML according to the present configuration example is parallel with the extending direction of the scanning signal lines GCL. The extending direction of the drive electrodes COML is not limited thereto. The extending direction of the drive electrodes COML may be parallel with the extending direction of the pixel signal lines SGL, for example. The extending direction of the touch detection electrodes TDL is not necessarily parallel with the extending direction of the pixel signal lines SGL. The extending direction of the touch detection electrodes TDL may be parallel with the extending direction of the scanning signal lines GCL.

The gate drivers 12A and 12B illustrated in FIG. 10 apply the scanning signals Vscan to the gates of the TFT elements Tr1 of the pixels Pix via the scanning signal line GCL illustrated in FIG. 12, thereby sequentially selecting one row (one horizontal line) out of the sub-pixels SPix arranged in a matrix (row-column configuration) in the display portion DP as a target of display drive.

The source driver 13 illustrated in FIG. 10 supplies the pixel signals Vpix to the respective sub-pixels SPix constituting one horizontal line sequentially selected by the gate drivers 12A and 12B via the pixel signal lines SGL illustrated in FIG. 12. These sub-pixels SPix perform display for one horizontal line in accordance with the supplied pixel signals Vpix.

The drive electrode drivers 14A and 14B illustrated in FIG. 10 apply the mutual drive signals Vcomtm1 or the drive voltage VcomDC, thereby driving the drive electrodes COML on a block-by-block basis, one block including a predetermined number of drive electrodes COML.

As described above, the gate drivers 12 line-sequentially scan and drive the scanning signal lines GCL in the display portion DP in a time-division manner, thereby sequentially selecting one horizontal line. The source driver 13 supplies the pixel signals Vpix to the sub-pixels SPix belonging to the horizontal line in the display portion DP, thereby performing display for each horizontal line. To perform the display operation, the drive electrode drivers 14A and 14B apply the drive voltage VcomDC to the block including the drive electrodes COML corresponding to the horizontal line.

The liquid crystal layer 6 modulates light passing therethrough according to the state of an electric field. When the drive electrode COML is driven, a voltage according to the pixel signals Vpix supplied to the pixel electrodes 22 is applied to the liquid crystal layer 6, thereby generating an electric field. The liquid crystals included in the liquid crystal layer 6 are oriented according to the electric field, which modulates light passing through the liquid crystal layer 6.

As described above, the pixel electrodes 22 and the drive electrodes COML respectively serve as first electrodes and second electrodes, which generate an electric field in the liquid crystal layer 6. In other words, the display portion DP serves as a display device that changes the contents of display according to electric charges applied to the first electrodes and the second electrodes. The following describes the pixel electrodes 22 as the first electrodes, and the drive electrodes COML as the second electrodes, but the pixel electrodes 22 may be the second electrodes, and the drive electrodes COML may be the first electrodes. Each pixel electrode 22 is provided for at least one pixel Pix or one sub-pixel SPix. Each drive electrode COML is provided to at least a plurality of pixels Pix or a plurality of sub-pixels SPix.

The present configuration example employs a liquid crystal display device, serving as the display portion DP that employs liquid crystals in the lateral electric field mode, such as the in-plane switching (IPS) mode including the fringe field switching (FFS) mode. An orientation film may be disposed between the liquid crystal layer 6 and the pixel substrate 2, and between the liquid crystal layer 6 and the counter substrate 3 illustrated in FIG. 11.

While the display portion DP has the configuration employing the lateral electric field mode, it may have a configuration employing other display modes. The display portion DP, for example, may have a configuration employing a mode that uses a vertical electric field generated mainly between the main surfaces of the substrates, such as the twisted nematic (TN) mode, the optically compensated bend (OCB) mode, and the vertical aligned (VA) mode. In the configuration employing the display mode that uses a vertical electric field, the pixel substrate 2 may include the pixel electrodes 22, and the counter substrate 3 may include the drive electrodes COML, for example.

The counter substrate 3 includes the second insulating substrate 31 and a color filter 32 formed on one surface of the second insulating substrate 31. The touch detection electrodes TDL serving as the detection electrodes of the first detector SE1 are formed on the other surface of the second insulating substrate 31. A polarization plate 35 is disposed on the touch detection electrodes TDL.

The method for mounting the color filter 32 may be a color-filter on array (COA) method of forming the color filter 32 on the pixel substrate 2 serving as an array substrate.

In the color filter 32 illustrated in FIG. 11, color regions of the color filter in three colors, e.g., red (R), green (G), and blue (B), are periodically arranged. Color regions 32R, 32G, and 32B in the respective three colors of R, G, and B, are associated with the respective sub-pixels SPix. A set of the color regions 32R, 32G, and 32B constitutes one pixel Pix.

The pixels Pix are arranged in a matrix (row-column configuration) in a direction parallel with the scanning signal lines GCL and a direction parallel with the pixel signal lines SGL, thereby constituting the display region Ad, which will be described later. The color filter 32 faces the liquid crystal layer 6 in the direction perpendicular to the TFT substrate 21. As described above, the sub-pixels SPix each can display a single color.

The color filter 32 may have another combination of colors as long as the colors are different from one another. The color filter 32 is not necessarily provided. Specifically, there may be a region without a color filter 32, that is, there may be a sub-pixel SPix without a color. The number of sub-pixels SPix included in one pixel Pix may be four or more.

Figure 13:
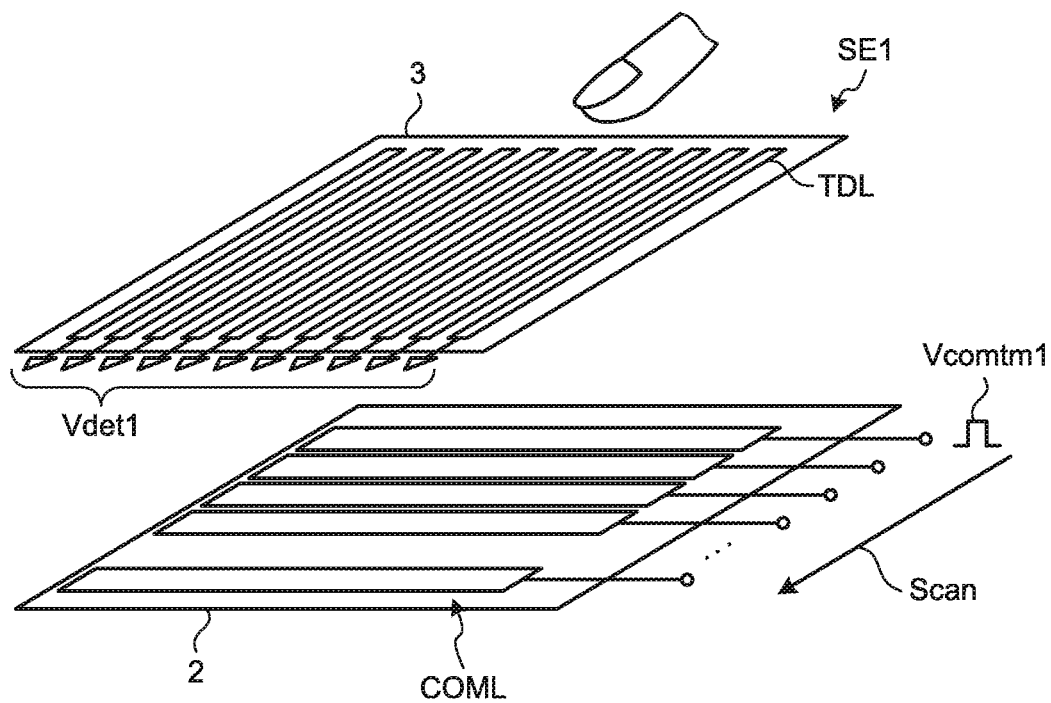
FIG. 13 is a perspective view illustrating an exemplary configuration of drive electrodes and touch detection electrodes in the first detector of the detection device according to the first embodiment.

FIG. 13 is a perspective view illustrating an exemplary configuration of the drive electrodes and the touch detection electrodes in the first detector of the detection device according to the first embodiment. The drive electrodes COML according to the present configuration example serve as the drive electrodes of the display portion DP and also as the drive electrodes of the first detector SE1.

The drive electrodes COML face the pixel electrodes 22 in the direction perpendicular to the surface of the TFT substrate 21. The drive electrodes COML provided to the pixel substrate 2 and the touch detection electrodes TDL provided to the counter substrate 3 constitute the first detector SE1.

The touch detection electrodes TDL are stripe electrode patterns extending in a direction intersecting with the extending direction of the electrode patterns of the drive electrodes COML. The touch detection electrodes TDL face the drive electrodes COML in the direction perpendicular to the surface of the TFT substrate 21. The electrode patterns of the touch detection electrodes TDL are coupled to the selector 4.

The electrode patterns formed by the drive electrodes COML and the touch detection electrodes TDL intersecting with each other have a capacitance at each intersection. In the first detector SE1, the touch detection electrodes TDL output the touch detection signals Vdet1 by the drive electrode drivers 14A and 14B applying the mutual drive signals Vcomtm1 to the drive electrodes COML. The first detector SE1 thus performs the touch detection.

In other words, the drive electrode COML corresponds to the drive electrode E1 in the basic principle of touch detection illustrated in FIGS. 2 to 4, and the touch detection electrode TDL corresponds to the touch detection electrode E2. The first detector SE1 detects a touch according to the basic principle.

As described above, the first detector SE1 includes the touch detection electrodes TDL that generate a capacitance with one of the first electrodes and the second electrodes (e.g., the drive electrodes COML serving as the second electrodes), and performs the touch detection according to a change in the capacitance.

The electrode patterns formed by the drive electrodes COML and the touch detection electrodes TDL intersecting with each other serve as touch sensors of the capacitance method arranged in a matrix (row-column configuration). By scanning the entire input surface of the first detector SE1, the detection device 1 can detect the position and the contact area where the object F1 is in contact with or in proximity to the input surface.

Specifically, when the first detector SE1 performs a touch detection operation, the drive electrode drivers 14A and 14B line-sequentially scan and drive the drive electrode blocks B illustrated in FIG. 10 in a time-division manner, thereby sequentially selecting each one drive electrode block B (one detection block) of the drive electrodes COML in a scanning direction Scan. Subsequently, in the first detector SE1, the touch detection electrodes TDL output the touch detection signals Vdet1. The first detector SE1 thus performs the touch detection for one detection block.

While the relation between the number of the detection blocks and the number of lines in display output may be arbitrarily determined, a touch detection region corresponding to two lines in the display region Ad serves as one detection block, according to the first embodiment. In other words, the relation between the number of detection blocks and any one of the number of the pixel electrodes, the number of the scanning signal lines, and the number of the pixel signal lines facing the detection block may be arbitrarily determined. In the first embodiment, one drive electrode COML faces two pixel electrodes or two scanning signal lines.

The touch detection electrodes TDL or the drive electrodes COML (drive electrode blocks B) do not necessarily have a shape divided into a plurality of stripe portions. The touch detection electrodes TDL or the drive electrodes COML (drive electrode blocks B) may have a comb shape, for example. The touch detection electrodes TDL or the drive electrodes COML (drive electrode blocks B) simply need to have a shape divided into a plurality of portions. The shape of slits that divide the drive electrodes COML may be a straight line or a curved line.

As an example of the operating method of the detection device 1, the detection device 1 performs a touch detection operation (in a touch detection period), a fingerprint detection operation (in a fingerprint detection period), and a display operation (in a display operation period) in a time division manner. The detection device 1 may perform the touch detection operation, the fingerprint detection operation, and the display operation in any division manner.

Referring back to FIG. 10, one of the short sides of the printed circuit board FPC1 is coupled to a short side of the first detector SE1. In other words, the printed circuit board FPC1 is coupled to the first detector SE1 such that the longitudinal direction of the printed circuit board FPC1 extends in parallel with the long side of the first detector SE1. The other of the short sides of the printed circuit board FPC1 is coupled to the substrate 61. The printed circuit board FPC1 may be a flexible printed circuit board, a rigid circuit board, or a rigid flexible circuit board.

The printed circuit board FPC1 has a protrusion FPC1a around its center position in the longitudinal direction, the protrusion protruding in a direction intersecting with the longitudinal direction. The protrusion FPC1a is coupled to a substrate 51 of the second detector SE2. The printed circuit board FPC1 is provided with the analog processor 5 at a portion farther from the first detector SE1 than the protrusion FPC1a. The analog processor 5 may be mounted as a semiconductor integrated circuit device on the printed circuit board FPC1.

While the second detector SE2 partially overlaps with the pixel substrate 2 when viewed in a direction perpendicular to the surface of the substrate 51, the present disclosure is not limited thereto. The second detector SE2 does not necessarily overlap with the pixel substrate 2 when viewed in the direction perpendicular to the surface of the substrate 51. In a case where the second detector SE2 partially overlaps with the pixel substrate 2 when viewed in the direction perpendicular to the surface of the substrate 51, the second detector SE2 may be or may not be in contact with the pixel substrate 2.

The substrate 51 includes a detection region 52 on which a fingerprint is detected, and a frame 53. A plurality of detection electrodes 54 are arranged in a matrix (row-column configuration) in the detection region 52. The frame 53 is a region in which no detection electrode 54 is arranged when viewed in the direction perpendicular to the surface of the substrate 51.

Figure 14:
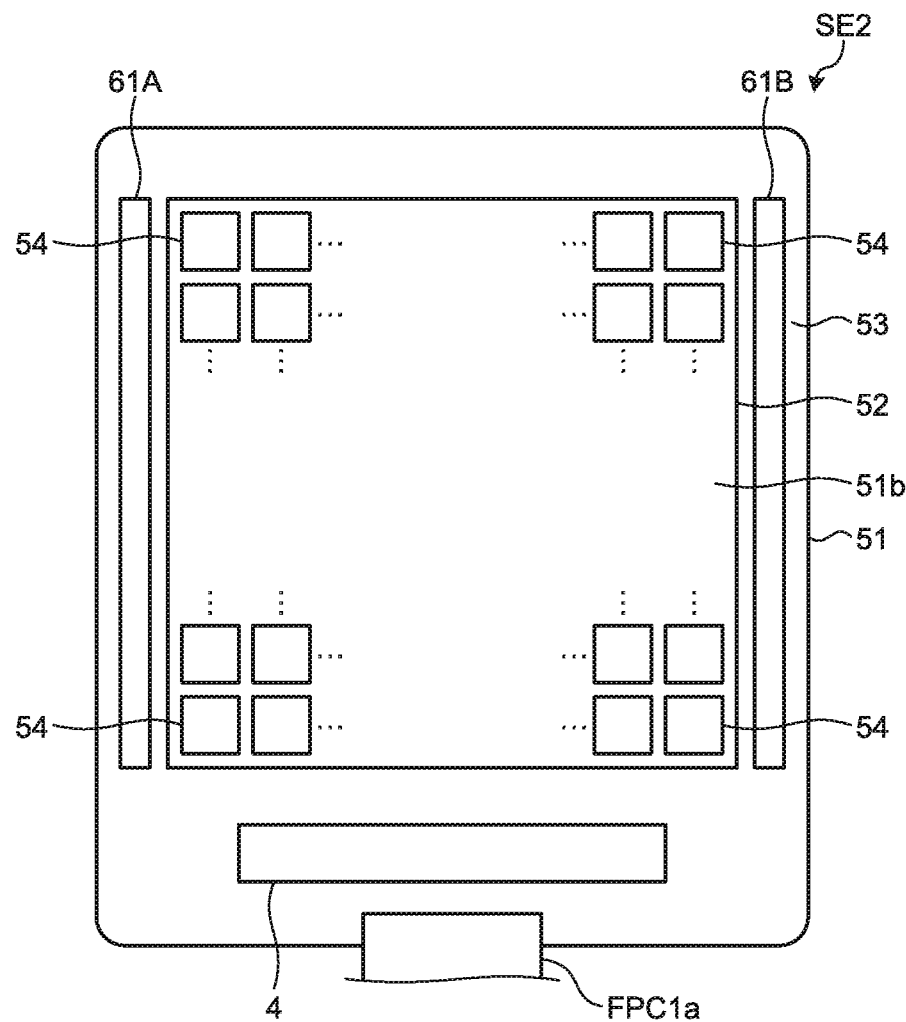
FIG. 14 is a plan view illustrating a second detector of the detection device according to the first embodiment.
Figure 15:
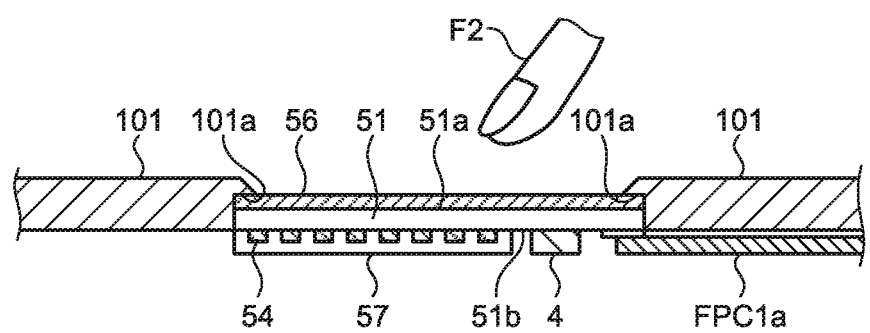
FIG. 15 is a sectional view illustrating a schematic sectional structure of the second detector of the detection device according to the first embodiment.

FIG. 14 is a plan view illustrating the second detector of the detection device according to the first embodiment. FIG. 15 is a sectional view illustrating a schematic sectional structure of the second detector of the detection device according to the first embodiment. Specifically, FIG. 15 is a sectional view illustrating a state where the second detector SE2 is accommodated in a housing 101 of an electronic apparatus. The second detector SE2 is embedded in an electronic apparatus, such as a smartphone, and is arranged on the same side (front surface side) as that of the display surface of the display portion DP on which an image is displayed. The second detector SE2 is embedded in an opening of the housing 101. When a finger F2 is in contact with or in proximity to the portion provided with the second detector SE2, the second detector SE2 detects a fingerprint.

As illustrated in FIGS. 14 and 15, the second detector SE2 includes the substrate 51 and the detection electrodes 54 provided to the substrate 51. The substrate 51 has a first surface 51a and a second surface 51b on the opposite side of the first surface 51a. The first surface 51a of the substrate 51 is a detection surface to detect unevenness of the finger F2 in contact with or in proximity to the second detector SE2. The detection electrodes 54 are provided on the second surface 51b of the substrate 51.

The region in which the detection electrodes 54 are disposed corresponds to the detection region 52 that can detect unevenness of the finger F2. The frame 53 is located outside the detection region 52. The selector 4 and the protrusion FPC1a of the printed circuit board FPC1 are provided in the frame 53.

As illustrated in FIG. 15, the first surface 51a of the substrate 51 may be provided with a protective layer 56 that protects the substrate 51, and the second surface 51b may be provided with a protective layer 57. The second surface 51b of the substrate 51 is further provided with the selector 4 and is coupled to the protrusion FPC1a of the printed circuit board FPC1. The selector 4 may include TFT elements, and be provided in the frame 53 on the second surface 51b of the substrate 51. Alternatively, the selector 4 may be disposed as a semiconductor integrated circuit device in the frame 53 on the second surface 51b of the substrate 51 or on the printed circuit board FPC1. The detection signals Vdet2 output from the detection electrodes 54 are output to the selector 4.

The substrate 51 can employ a glass substrate. Employing toughened glass for the substrate 51, for example, can make the substrate 51 thinner while maintaining its strength. Examples of the toughened glass may include, but are not limited to: chemically toughened glass, on the surface of which a compressive stress layer is formed by exchanging sodium (Na) ions on the surface of the glass for potassium (K) ions having a larger ionic radius; and toughened glass, on the surface of which a compressive stress layer is formed by feeding air to a heated glass substrate for rapid cooling. The substrate 51 may be made of six-face toughened glass.

The detection electrodes 54 are provided on the second surface 51b of the substrate 51. As illustrated in FIG. 14, the detection electrodes 54 each have a rectangular shape and are arranged in a matrix (row-column configuration). The detection electrodes 54, for example, are arrayed at a pitch of 50 mm in the row direction, and at a pitch of 50 mm in the column direction. The array pitch in the row direction may be different from that in the column direction. The detection electrodes 54 arranged in a matrix (row-column configuration) detect a fingerprint of the finger F2. The detection electrodes 54 each correspond to the detection electrode E1 in the basic principle of the self-capacitance fingerprint detection described above. The detection electrodes 54 can detect a fingerprint of a finger in contact with or in proximity to the second detector SE2 in accordance with a change in the capacitance of the respective detection electrodes 54. The detection electrodes 54 are made of a metal material, such as molybdenum (Mo). Alternatively, the detection electrodes 54 may be made of at least one metal material of aluminum (Al), copper (Cu), silver (Ag), and an alloy of these metals.

The frame 53 on the second surface 51b of the substrate 51 is further provided with gate drivers 61A and 61B. The gate drivers 61A and 61B sequentially select the detection electrodes 54 row by row in accordance with control signals supplied from the controller 47.

While the present configuration example includes the two circuits, i.e., the gate drivers 61A and 61B, this is merely one example of a specific configuration of the gate driver, and the present disclosure is not limited thereto. The gate driver may be one circuit provided at only one side of the frame 53, for example.

As illustrated in FIG. 15, the frame 53 of the substrate 51 is fixed to a stationary part 101a of the housing 101. The first surface 51a of the substrate 51 is exposed from the opening of the housing 101. The detection region 52 overlaps with the opening. When the finger F2 of an operator is in contact with or in proximity to the opening of the housing 101, the second detector SE2 can detect a fingerprint of the finger F2.

As described above, the second detector SE2 has the first surface 51a serving as the detection surface, and the second surface 51b on the opposite side of the first surface 51a. The second surface 51b is provided with the detection electrodes 54, the selector 4, and the protrusion FPC1a of the printed circuit board FPC1. In fixing the substrate 51 to the housing 101, this configuration can reduce constraints by the unevenness of the selector 4 and that of the protrusion FPC1a of the printed circuit board FPC1. In other words, this configuration can simplify the structure of the housing 101 to which the first surface 51a side of the substrate 51 is fixed, thereby facilitating processing of the housing and attachment of the second detector SE2 to the housing 101. In addition, since the selector 4 and the protrusion FPC1a of the printed circuit board FPC1 are provided on the second surface 51b, no conductor including wiring is present on a side closer to the first surface 51a than the detection electrodes 54. This configuration can reduce detection errors and prevent deterioration in the detection sensitivity.

Figure 16:
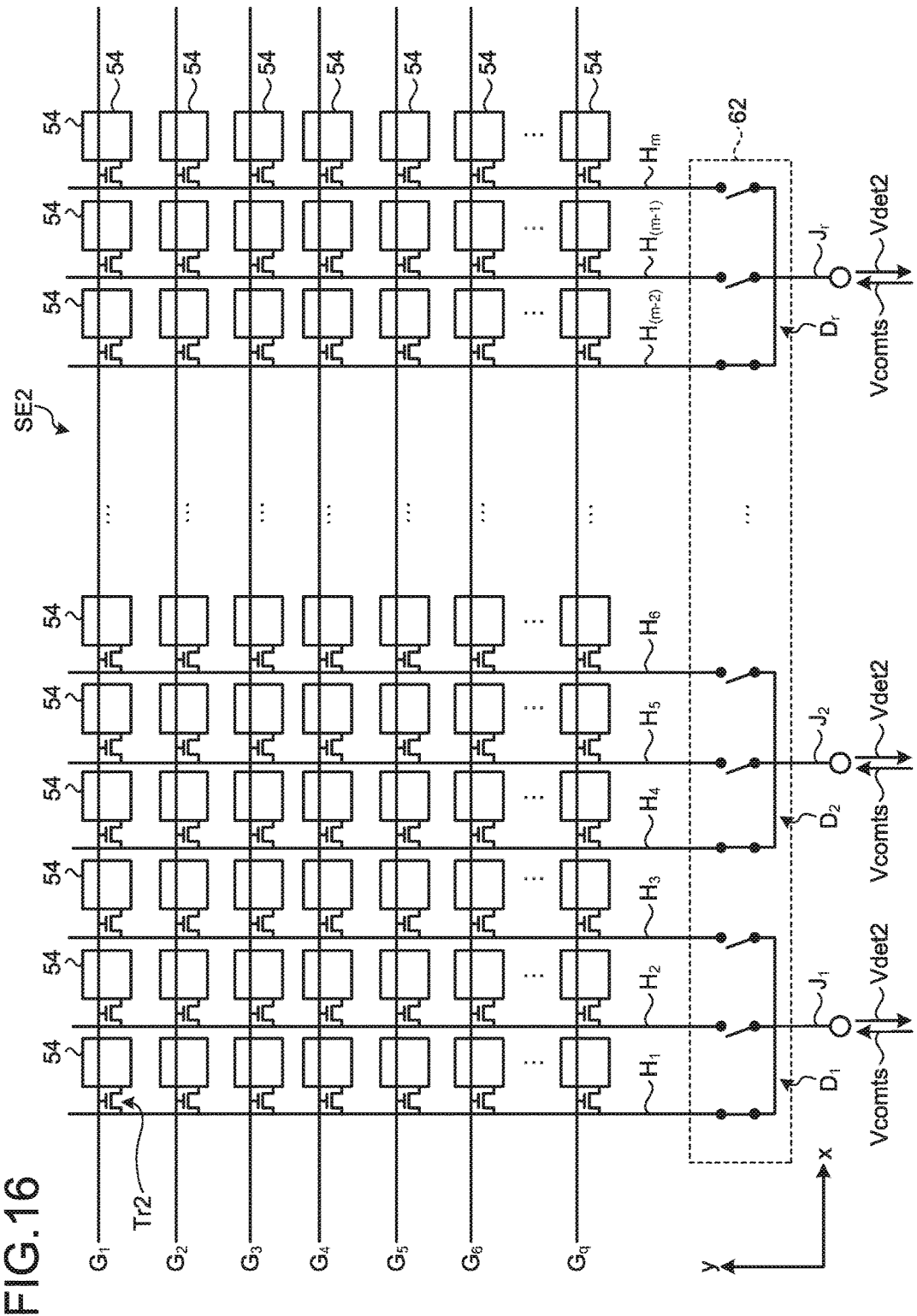
FIG. 16 is a diagram illustrating arrangement of electrodes in the second detector of the detection device according to the first embodiment.

FIG. 16 is a diagram illustrating arrangement of electrodes in the second detector of the detection device according to the first embodiment. The second detector SE2 includes the detection electrodes 54 and a selector 62.

As illustrated in FIG. 16, the second detector SE2 includes the detection electrodes 54 arranged in a matrix (row-column configuration). One of the sources and the drains of a plurality of TFT elements Tr2 are coupled to the respective detection electrodes 54. The TFT element Tr2 is a thin-film transistor, and is an n-channel MOS TFT in this example. The other of the sources and the drains of the TFT elements Tr2 are coupled to respective signal lines $H_1, H_2, \ldots,$ and $H_m$, and the gates thereof are coupled to respective scanning lines $G_1, G_2, \ldots,$ and $G_q$.

The detection electrode 54 is coupled to the other detection electrodes 54 belonging to the same row in the second detector SE2 by one of the scanning lines $G_1, G_2, \ldots,$ and $G_q$. The scanning lines $G_1, G_2, \ldots,$ and $G_q$ are coupled to the gate drivers 61A and 61B, and are supplied with scanning signals from the gate drivers 61A and 61B. The gate drivers 61A and 61B sequentially select the detection electrodes 54 row by row in accordance with control signals supplied from the controller 47.

The detection electrode 54 is coupled to the other detection electrodes 54 belonging to the same column in the second detector SE2 by the respective signal lines $H_1, H_2, \ldots,$ and $H_m$. The signal lines $H_1, H_2, \ldots,$ and $H_m$ are coupled to the selector 62, and are supplied with the self-drive signals Vcomts from the selector 4 via the selector 62.

The selector 62 has a function to output the self-drive signals Vcomts supplied from the selector 4 to one of the signal lines coupled to the detection electrodes 54 side of the selector 62 in accordance with control signals supplied from the controller 47.

Specifically, the selector 62 includes connections $D_1, D_2, \ldots,$ and $D_r$. The connections $D_1, D_2, \ldots,$ and $D_r$ are each coupled, via switches, to the signal lines coupled to respective three detection electrodes 54 aligned in the x-direction, for example. The connections $D_1, D_2, \ldots,$ and $D_r$ on the selector 4 side serve as a single system. The connections $D_1, D_2, \ldots,$ and $D_r$ on the selector 4 side are coupled to respective wires $J_1, J_2, \ldots,$ and $J_r$. In the selector 62 according to the first embodiment, the number of wires on the selector 4 side is equal to the number (r) of the connections $D_1, D_2, \ldots,$ and $D_r$. The number of wires on the detection electrode 54 side is equal to the number (m) of the signal lines $H_1, H_2, \ldots,$ and $H_m$. In other words, one connection is provided to three signal lines. With this configuration, the selector 62 outputs the self-drive signal Vcomts supplied from the selector 4 to any one of up to three detection electrodes 54 aligned in the x-direction.

The selector 62 also has a function to output, to the selector 4, the detection signal Vdet2 supplied via any one of the signal lines coupled to the detection electrode 54 side of the selector, in accordance with control signals supplied from the controller 47. With the configuration in which one connection is provided to three signal lines, the selector 62 outputs, to the selector 4, any one of the detection signals Vdet2 supplied from up to three detection electrodes 54 aligned in the x-direction.

Figure 17:
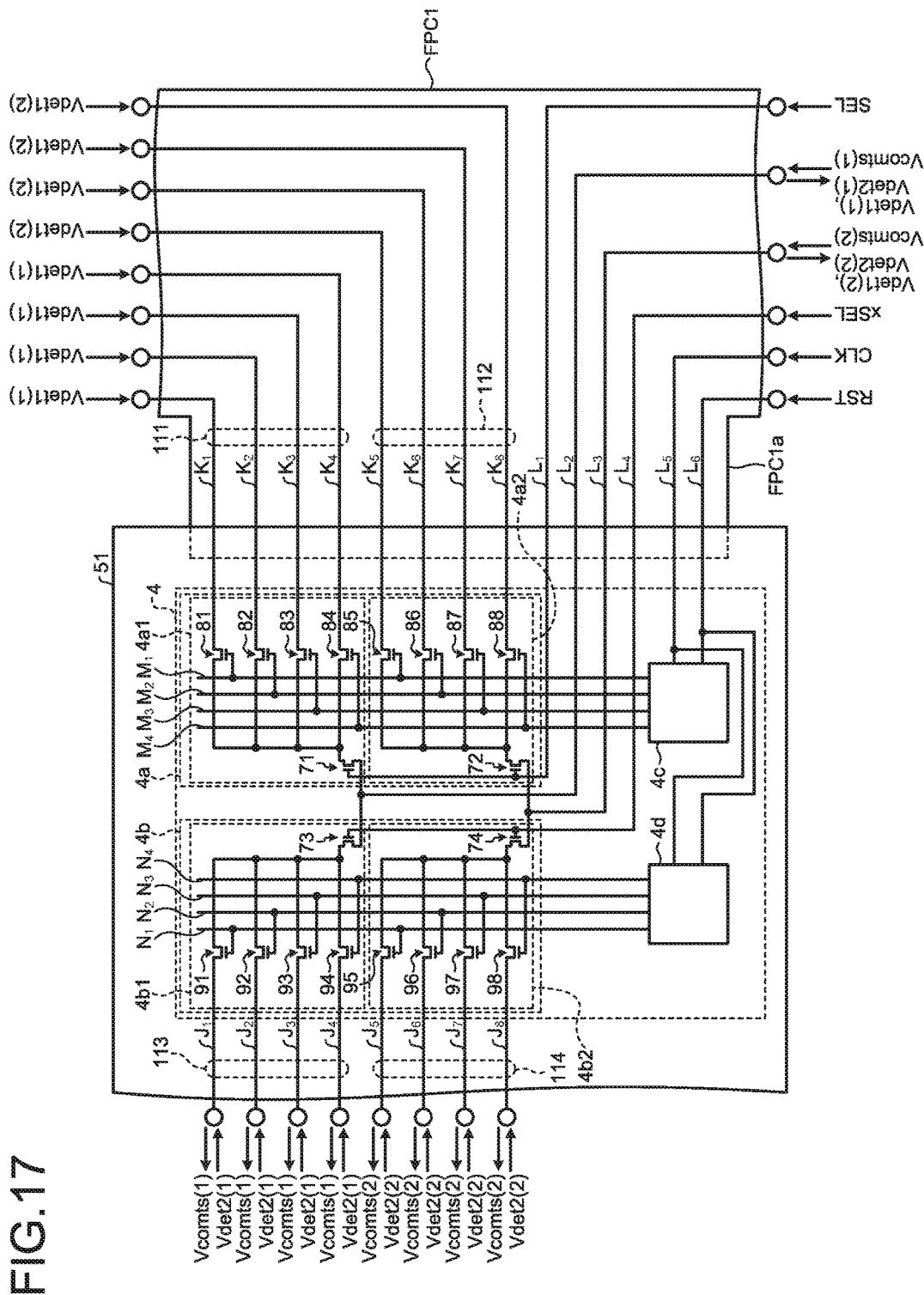
FIG. 17 is a diagram illustrating a circuit configuration of a selector of the detection device according to the first embodiment.

FIG. 17 is a diagram illustrating a circuit configuration of the selector of the detection device according to the first embodiment. As illustrated in FIG. 17, the selector 4 includes a first connector 4a, a second connector 4b, a first controller 4c, and a second controller 4d. The first connector 4a couples the first detector SE1 to the analog processor 5. The second connector 4b couples the second detector SE2 to the analog processor 5. The first controller 4c controls the first connector 4a. The second controller 4d controls the second connector 4b.

The first connector 4a is coupled to the first detector SE1 via wires $K_1, K_2, \ldots,$ and $K_8$. The wires $K_1, K_2, \ldots,$ and $K_8$ are coupled to the respective touch detection electrodes TDL in the first detector SE1. In other words, the first connector 4a is coupled to the touch detection electrodes TDL in the first detector SE1. While the number of wires K according to the first embodiment is eight, the present disclosure is not limited thereto.

The second connector 4b is coupled to the second detector SE2 via wires $J_1, J_2, \ldots,$ and $J_8$. The wires $J_1, J_2, \ldots,$ and $J_8$ are coupled to the respective connections $D_1, D_2, \ldots,$ and $D_8$ in the selector 62 of the second detector SE2. The connections $D_1, D_2, \ldots,$ and $D_8$ are coupled to the detection electrodes 54. In other words, the second connector 4b is coupled to the detection electrodes 54 in the second detector SE2. While the number of wires J according to the first embodiment is eight, the present disclosure is not limited thereto.

While the number of wires K according to the first embodiment is equal to that of wires J, the present disclosure is not limited thereto. The number of wires K may be different from that of wires J.

The selector 4 is coupled to the host HST via wires $L_1, L_4, L_5,$ and $L_6$. The wire $L_1$ is supplied from the host HST with selection signals SEL for selecting the first detector SE1 out of the first detector SE1 and the second detector SE2. The wire $L_4$ is supplied from the host HST with inverted selection signals xSEL for selecting the second detector SE2 out of the first detector SE1 and the second detector SE2. According to the first embodiment, the inverted selection signal xSEL is a logically inverted signal of the selection signal SEL.

The wire $L_5$ is supplied with clock signals CLK from the host HST. The first controller 4c and the second controller 4d count the clock signals CLK to control the first connector 4a and the second connector 4b, respectively. The first controller 4c and the second controller 4d are counter circuits or decoder circuits, for example.

The first controller 4c is coupled to the first connector 4a via wires $M_1$ to $M_4$. The first controller 4c sequentially outputs high-level signals from the wire $M_1$ to the wire $M_4$ in the order of the wire $M_1$, the wire $M_2$, the wire $M_3$, the wire $M_4$, the wire $M_1, \ldots$ in accordance with the count value of the clock signals CLK. The second controller 4d sequentially outputs high-level signals from a wire $N_1$ to a wire $N_4$ in the order of the wire $N_1$, the wire $N_2$, the wire $N_3$, the wire $N_4$, the wire $N_1, \ldots$ in accordance with the count value of the clock signals CLK.

The wire $L_6$ is supplied from the host HST with reset signals RST for resetting the first controller 4c and the second controller 4d. When receiving the reset signals RST, the first controller 4c and the second controller 4d reset the count value of the clock signals CLK.

The selector 4 is coupled to the analog processor 5 via wires $L_2$ and $L_3$. The analog processor 5 according to the first embodiment includes two analog processing channels that can input or output two analog signals simultaneously. Specifically, the self-drive signal transmitter 41 (refer to FIG. 1) in the analog processor 5 includes two analog output channels, and can output two self-drive signals Vcomts(1) and Vcomts(2) simultaneously. The amplifier 42 (refer to FIG. 1) in the analog processor 5 includes two analog input channels, and can simultaneously amplify detection signals Vdet1(1) and Vdet1(2), or detection signals Vdet2(1) and Vdet2(2). The A/D converter 43 (refer to FIG. 1) in the analog processor 5 includes two A/D conversion circuits, and can simultaneously convert two analog signals output from the amplifier 42 into digital signals.

The wire $L_2$ is coupled to one of the analog processing channels of the analog processor 5, and the wire $L_3$ is coupled to the other of the analog processing channels of the analog processor 5. The wire $L_2$ is supplied with the self-drive signals Vcomts(1) for detecting a self-capacitance from the one of the analog output channels of the self-drive signal transmitter 41. The wire $L_3$ is supplied with the self-drive signals Vcomts(2) for detecting a self-capacitance from the other of the analog output channels of the self-drive signal transmitter 41.

In step with the analog processor 5 including the two analog processing channels, the first connector 4a includes a first circuit 4a1 and a second circuit 4a2 that couple the first detector SE1 to the analog processor 5. The first circuit 4a1 couples a first wire group 111 including the wires $K_1$ to $K_4$ to the one of the analog processing channels of the analog processor 5. The second circuit 4a2 couples a second wire group 112 including the wires $K_5$ to $K_8$ to the other of the analog processing channels of the analog processor 5.

Specifically, the first circuit 4a1 sequentially selects any one of the wires $K_1$ to $K_4$ of the first wire group 111 in accordance with signals supplied to the wires $M_1$ to $M_4$, and couples the selected one to the wire $L_2$. As a result, the detection signals Vdet1(1) supplied from the first detector SE1 to the wires $K_1$ to $K_4$ are sequentially supplied to the one of the analog input channels of the amplifier 42 in the analog processor 5.

The second circuit 4a2 sequentially selects any one of the wires $K_5$ to $K_8$ of the second wire group 112 in accordance with signals supplied to the wires $M_1$ to $M_4$, and couples the selected one to the wire $L_3$. As a result, the detection signals Vdet1(2) supplied from the first detector SE1 to the wires $K_5$ to $K_8$ are sequentially supplied to the other of the analog input channels of the amplifier 42 in the analog processor 5.

The first connector 4a simultaneously couples two groups of the touch detection electrodes TDL in the first detector SE1 to the respective two analog processing channels of the analog processor 5.

In step with the analog processor 5 including the two analog processing channels, the second connector 4b includes a third circuit 4b1 and a fourth circuit 4b2 that couple the second detector SE2 to the analog processor 5. The third circuit 4b1 couples a third wire group 113 including the wires $J_1$ to $J_4$ to the one of the analog processing channels of the analog processor 5. The fourth circuit 4b2 couples a fourth wire group 114 including the wires $J_5$ to $J_8$ to the other of the analog processing channels of the analog processor 5.

Specifically, the third circuit 4b1 sequentially selects any one of the wires $J_1$ to $J_4$ of the third wire group 113 in accordance with signals supplied to the wires $N_1$ to $N_4$, and couples the selected one to the wire $L_2$. As a result, the self-drive signals Vcomts(1) supplied from the one of the analog output channels of the self-drive signal transmitter 41 to the wire $L_2$ are sequentially supplied to the wires $J_1$ to $J_4$. The detection signals Vdet2(1) supplied from the second detector SE2 to the wires $J_1$ to $J_4$ are sequentially supplied to the one of the analog input channels of the amplifier 42 in the analog processor 5.

The fourth circuit 4b2 sequentially selects any one of the wires $J_5$ to $J_8$ of the fourth wire group 114 in accordance with signals supplied to the wires $N_1$ to $N_4$, and couples the selected one to the wire $L_3$. As a result, the self-drive signals Vcomts(2) supplied from the other of the analog output channels of the self-drive signal transmitter 41 to the wire $L_3$ are sequentially supplied to the wires $J_5$ to $J_8$. The detection signals Vdet2(2) supplied from the second detector SE2 to the wires $J_5$ to $J_8$ are sequentially supplied to the other of the analog input channels of the amplifier 42 in the analog processor 5.

The second connector 4b simultaneously couples two groups of the detection electrodes 54 in the second detector SE2 to the respective two analog processing channels of the analog processor 5.

The first circuit 4a1 includes N-channel transistors 71 and 81 to 84. The gate of the transistor 71 is coupled to the wire $L_1$. When receiving high-level selection signals SEL from the host HST via the wire $L_1$, the transistor 71 is turned ON.

One of the source and the drain of the transistor 71 is coupled to the one of the analog processing channels of the analog processor 5 via the wire $L_2$.

One of the sources and the drains of the transistors 81 to 84 are coupled to the other of the source and the drain of the transistor 71. The other of the source and the drain of the transistor 81 is coupled to the wire $K_1$. The other of the source and the drain of the transistor 82 is coupled to the wire $K_2$. The other of the source and the drain of the transistor 83 is coupled to the wire $K_3$. The other of the source and the drain of the transistor 84 is coupled to the wire $K_4$.

The second circuit 4a2 includes N-channel transistors 72 and 85 to 88. The gate of the transistor 72 is coupled to the wire $L_1$. When receiving high-level selection signals SEL from the host HST via the wire $L_1$, the transistor 72 is turned ON.

One of the source and the drain of the transistor 72 is coupled to the other of the analog processing channels of the analog processor 5 via the wire $L_3$.

One of the sources and the drains of the transistors 85 to 88 are coupled to the other of the source and the drain of the transistor 72. The other of the source and the drain of the transistor 85 is coupled to the wire $K_5$. The other of the source and the drain of the transistor 86 is coupled to the wire $K_6$. The other of the source and the drain of the transistor 87 is coupled to the wire $K_7$. The other of the source and the drain of the transistor 88 is coupled to the wire $K_8$.

The gates of the transistors 81 and 85 are coupled to the first controller 4c via the wire $M_1$. When high-level signals are supplied from the first controller 4c to the wire $M_1$, the transistors 81 and 85 are turned ON.

The gates of the transistors 82 and 86 are coupled to the first controller 4c via the wire $M_2$. When high-level signals are supplied from the first controller 4c to the wire $M_2$, the transistors 82 and 86 are turned ON.

The gates of the transistors 83 and 87 are coupled to the first controller 4c via the wire $M_3$. When high-level signals are supplied from the first controller 4c to the wire $M_3$, the transistors 83 and 87 are turned ON.

The gates of the transistors 84 and 88 are coupled to the first controller 4c via the wire $M_4$. When high-level signals are supplied from the first controller 4c to the wire $M_4$, the transistors 84 and 88 are turned ON.

The third circuit 4b1 includes N-channel transistors 73 and 91 to 94. The gate of the transistor 73 is coupled to the wire $L_4$. When receiving high-level inverted selection signals xSEL from the host HST via the wire $L_4$, the transistor 73 is turned ON.

One of the source and the drain of the transistor 73 is coupled to the one of the analog processing channels of the analog processor 5 via the wire $L_2$.

One of the sources and the drains of the transistors 91 to 94 are coupled to the other of the source and the drain of the transistor 73. The other of the source and the drain of the transistor 91 is coupled to the wire $J_1$. The other of the source and the drain of the transistor 92 is coupled to the wire $J_2$. The other of the source and the drain of the transistor 93 is coupled to the wire $J_3$. The other of the source and the drain of the transistor 94 is coupled to the wire $J_4$.

The fourth circuit 4b2 includes N-channel transistors 74 and 95 to 98. The gate of the transistor 74 is coupled to the wire $L_4$. When receiving high-level inverted selection signals xSEL from the host HST via the wire $L_4$, the transistor 74 is turned ON.

One of the source and the drain of the transistor 74 is coupled to the other of the analog processing channels of the analog processor 5 via the wire $L_3$.

One of the sources and the drains of the transistors 95 to 98 are coupled to the other of the source and the drain of the transistor 74. The other of the source and the drain of the transistor 95 is coupled to the wire $J_5$. The other of the source and the drain of the transistor 96 is coupled to the wire $J_6$. The other of the source and the drain of the transistor 97 is coupled to the wire $J_7$. The other of the source and the drain of the transistor 98 is coupled to the wire $J_8$.

The gates of the transistors 91 and 95 are coupled to the second controller 4*d* via the wire $N_1$. When high-level signals are supplied from the second controller 4*d* to the wire $N_1$, the transistors 91 and 95 are turned ON.

The gates of the transistors 92 and 96 are coupled to the second controller 4*d* via the wire $N_2$. When high-level signals are supplied from the second controller 4*d* to the wire $N_2$, the transistors 92 and 96 are turned ON.

The gates of the transistors 93 and 97 are coupled to the second controller 4*d* via the wire $N_3$. When high-level signals are supplied from the second controller 4*d* to the wire $N_3$, the transistors 93 and 97 are turned ON.

The gates of the transistors 94 and 98 are coupled to the second controller 4*d* via the wire $N_4$. When high-level signals are supplied from the second controller 4*d* to the wire $N_4$, the transistors 94 and 98 are turned ON.

Figure 18:
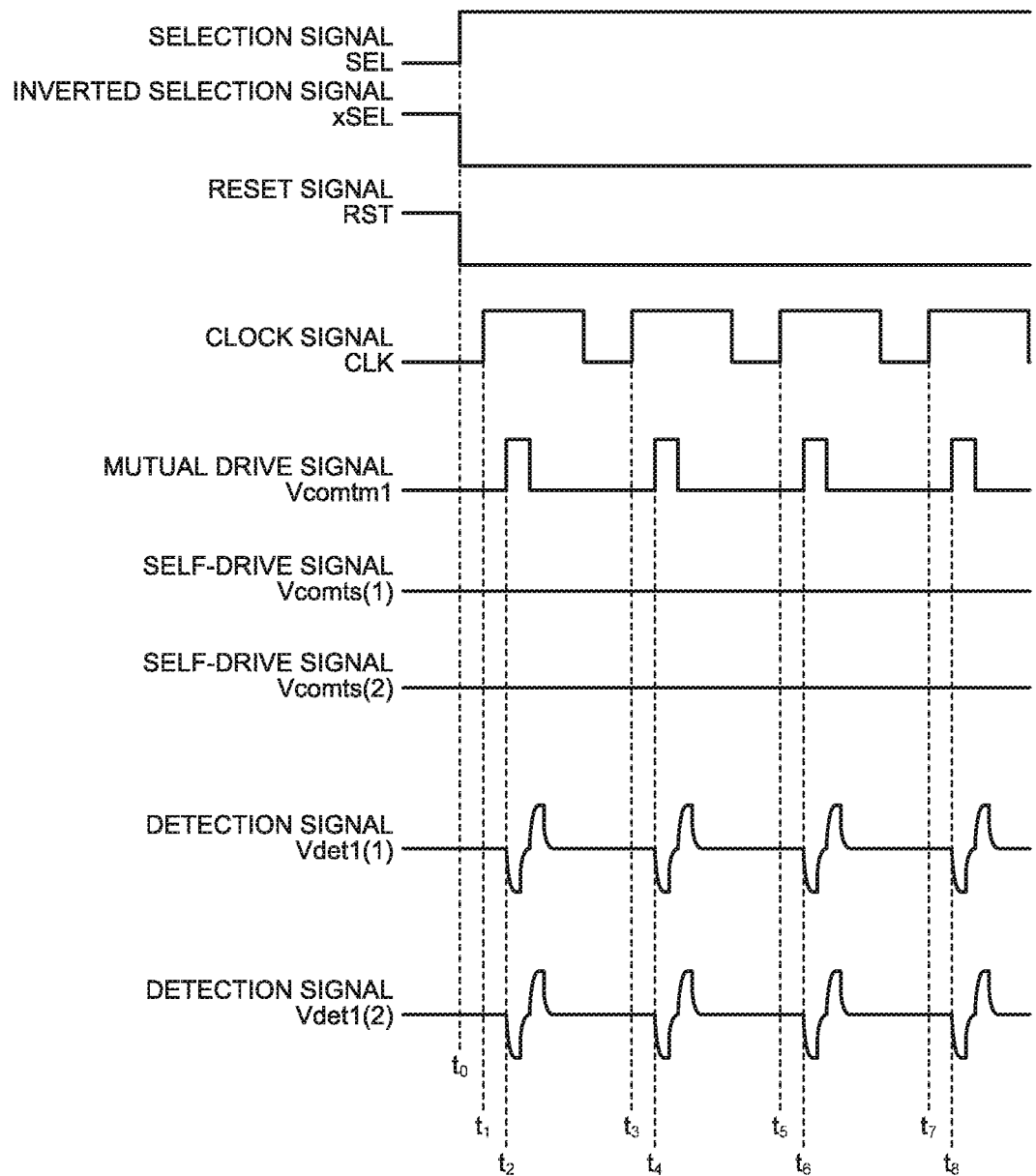
FIG. 18 is a timing chart of an operation performed by the selector of the detection device according to the first embodiment.

FIG. 18 is a timing chart of an operation performed by the selector of the detection device according to the first embodiment. Specifically, FIG. 18 is a timing chart when the selector 4 selects the first detector SE1 out of the first detector SE1 and the second detector SE2, and couples the selected first detector SE1 to the analog processor 5.

As illustrated in FIG. 18, when the selection signal SEL supplied from the host HST changes from the low level to the high level at timing $t_0$, the transistors 71 and 72 in the first connector 4*a* are turned ON. When the inverted selection signal xSEL supplied from the host HST changes from the high level to the low level, the transistors 73 and 74 in the second connector 4*b* are turned OFF. When the reset signal RST changes from the high level to the low level, the resetting of the count value in the first controller 4*c* is cancelled.

When the clock signal CLK supplied from the host HST changes from the low level to the high level at the next timing $t_1$, the first controller 4*c* counts the clock signal CLK, and outputs the high-level signal to the wire $M_1$ in accordance with the count value (=1). As a result, the transistors 81 and 85 in the first connector 4*a* are turned ON.

When the mutual drive signal Vcomtm1 supplied from the COG 19 (refer to FIG. 10) to one drive electrode block B in the first detector SE1 changes to the high level at the next timing $t_2$, the detection signal Vdet1 described in the principle of the mutual capacitance detection (refer to FIGS. 2 to 4) appears in the touch detection electrode TDL. Because the transistors 81 and 71 are turned ON at the timing $t_2$, the detection signal Vdet1(1) appearing in the wire $K_1$ is supplied to the one of the analog input channels of the amplifier 42 in the analog processor 5. Because the transistors 85 and 72 are also turned ON at the timing $t_2$, the detection signal Vdet1(2) appearing in the wire $K_5$ is supplied to the other of the analog input channels of the amplifier 42 in the analog processor 5.

The detection signals Vdet1(1) and Vdet1(2) illustrated in FIG. 18 do not indicate actual waveforms appearing in the touch detection electrode TDL, but indicate output waveforms in the voltage detector DET in the amplifier 42.

When the clock signal CLK supplied from the host HST changes from the low level to the high level at the next timing $t_3$, the first controller 4*c* counts the clock signal CLK, and outputs the high-level signal to the wire $M_2$ in accordance with the count value (=2). As a result, the transistors 82 and 86 in the first connector 4*a* are turned ON.

When the mutual drive signal Vcomtm1 supplied from the COG 19 to one drive electrode block B in the first detector SE1 changes to the high level at the next timing $t_4$, the detection signal Vdet1 described in the principle of the mutual capacitance detection appears in the touch detection electrode TDL. Because the transistors 82 and 71 are turned ON at the timing $t_4$, the detection signal Vdet1(1) appearing in the wire $K_2$ is supplied to the one of the analog input channels of the amplifier 42 in the analog processor 5. Because the transistors 86 and 72 are also turned ON at the timing $t_4$, the detection signal Vdet1(2) appearing in the wire $K_6$ is supplied to the other of the analog input channels of the amplifier 42 in the analog processor 5.

When the clock signal CLK supplied from the host HST changes from the low level to the high level at the next timing $t_5$, the first controller 4*c* counts the clock signal CLK, and outputs the high-level signal to the wire $M_3$ in accordance with the count value (=3). As a result, the transistors 83 and 87 in the first connector 4*a* are turned ON.

When the mutual drive signal Vcomtm1 supplied from the COG 19 to one drive electrode block B in the first detector SE1 changes to the high level at the next timing $t_6$, the detection signal Vdet1 described in the principle of the mutual capacitance detection appears in the touch detection electrode TDL. Because the transistors 83 and 71 are turned ON at the timing $t_6$, the detection signal Vdet1(1) appearing in the wire $K_3$ is supplied to the one of the analog input channels of the amplifier 42 in the analog processor 5. Because the transistors 87 and 72 are also turned ON at the timing $t_6$, the detection signal Vdet1(2) appearing in the wire $K_7$ is supplied to the other of the analog input channels of the amplifier 42 in the analog processor 5.

When the clock signal CLK supplied from the host HST changes from the low level to the high level at the next timing $t_7$, the first controller 4*c* counts the clock signal CLK, and outputs the high-level signal to the wire $M_4$ in accordance with the count value (=4). As a result, the transistors 84 and 88 in the first connector 4*a* are turned ON.

When the mutual drive signal Vcomtm1 supplied from the COG 19 to one drive electrode block B in the first detector SE1 changes to the high level at the next timing $t_8$, the detection signal Vdet1 described in the principle of the mutual capacitance detection appears in the touch detection electrode TDL. Because the transistors 84 and 71 are turned ON at the timing $t_8$, the detection signal Vdet1(1) appearing in the wire $K_4$ is supplied to the one of the analog input channels of the amplifier 42 in the analog processor 5. Because the transistors 88 and 72 are also turned ON at the timing $t_8$, the detection signal Vdet1(2) appearing in the wire $K_8$ is supplied to the other of the analog input channels of the amplifier 42 in the analog processor 5.

From the timing $t_1$ to the timing $t_8$, the detection device 1 can perform detection for one drive electrode block B in the first detector SE1. By repeating the processing performed from the timing $t_1$ to the timing $t_8$ the same number of times as the number of the drive electrode blocks B, the detection device 1 can perform detection for the entire detection region of the first detector SE1.

Figure 19:
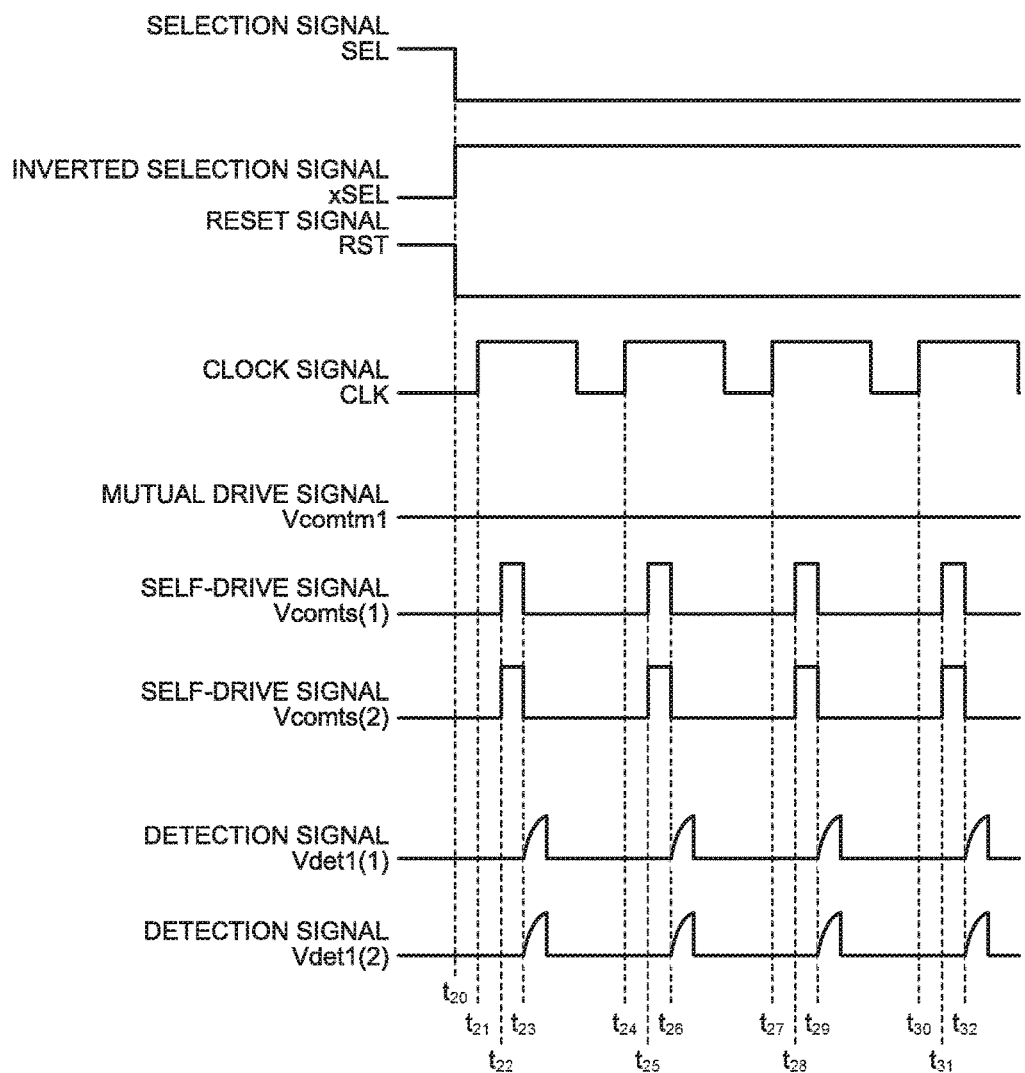
FIG. 19 is a timing chart of an operation performed by the selector of the detection device according to the first embodiment.

FIG. 19 is a timing chart of an operation performed by the selector of the detection device according to the first embodiment. Specifically, FIG. 19 is a timing chart when the selector 4 selects the second detector SE2 out of the first detector SE1 and the second detector SE2, and couples the selected second detector SE2 to the analog processor 5.

As illustrated in FIG. 19, when the selection signal SEL supplied from the host HST changes from the high level to the low level at timing $t_{20}$, the transistors 71 and 72 in the first connector 4*a* are turned OFF. When the inverted selection signal xSEL supplied from the host HST changes from the low level to the high level, the transistors 73 and 74 in the second connector 4b are turned ON. When the reset signal RST changes from the high level to the low level, the resetting of the count value in the second controller 4d is cancelled.

When the clock signal CLK supplied from the host HST changes from the low level to the high level at the next timing $t_{21}$, the second controller 4d counts the clock signal CLK, and outputs the high-level signal to the wire $N_1$ in accordance with the count value (=1). As a result, the transistors 91 and 95 in the second connector 4b are turned ON.

When the self-drive signal Vcomts(1) supplied from the one of the analog output channels of the self-drive signal transmitter 41 in the analog processor 5 changes from the low level to the high level at the next timing $t_{22}$, the high-level self-drive signal Vcomts(1) is supplied to the wire $J_1$ via the transistors 73 and 91.

Similarly, when the self-drive signal Vcomts(2) supplied from the other of the analog output channels of the self-drive signal transmitter 41 in the analog processor 5 changes from the low level to the high level at the timing $t_{22}$, the high-level self-drive signal Vcomts(2) is supplied to the wire $J_5$ via the transistors 74 and 95.

When the self-drive signal Vcomts(1) supplied from the one of the analog output channels of the self-drive signal transmitter 41 in the analog processor 5 changes from the high level to the low level at the next timing $t_{23}$, the detection signal Vdet2(1) described in the principle of the self-capacitance detection (refer to FIGS. 5 to 8) appears in the wire $J_1$. Because the transistors 91 and 73 are turned ON at the timing $t_{23}$, the detection signal Vdet2(1) appearing in the wire $J_1$ is supplied to the one of the analog input channels of the amplifier 42 in the analog processor 5.

Similarly, when the self-drive signal Vcomts(2) supplied from the other of the analog output channels of the self-drive signal transmitter 41 in the analog processor 5 changes from the high level to the low level at the timing $t_{23}$, the detection signal Vdet2(2) described in the principle of the self-capacitance detection appears in the wire $J_5$. Because the transistors 95 and 74 are turned ON at the timing $t_{23}$, the detection signal Vdet2(2) appearing in the wire $J_5$ is supplied to the other of the analog input channels of the amplifier 42 in the analog processor 5.

The detection signals Vdet2(1) and Vdet2(2) illustrated in FIG. 19 do not indicate actual waveforms appearing in the respective wires $J_1$ and $J_5$, but indicate output waveforms in the voltage detector DET in the amplifier 42.

When the clock signal CLK supplied from the host HST changes from the low level to the high level at the next timing $t_{24}$, the second controller 4d counts the clock signal CLK, and outputs the high-level signal to the wire $N_2$ in accordance with the count value (=2). As a result, the transistors 92 and 96 in the second connector 4b are turned ON.

When the self-drive signal Vcomts(1) supplied from the one of the analog output channels of the self-drive signal transmitter 41 in the analog processor 5 changes from the low level to the high level at the next timing $t_{25}$, the high-level self-drive signal Vcomts(1) is supplied to the wire $J_2$ via the transistors 73 and 92.

Similarly, when the self-drive signal Vcomts(2) supplied from the other of the analog output channels of the self-drive signal transmitter 41 in the analog processor 5 changes from the low level to the high level at the timing $t_{25}$, the high-level self-drive signal Vcomts(2) is supplied to the wire $J_6$ via the transistors 74 and 96.

When the self-drive signal Vcomts(1) supplied from the one of the analog output channels of the self-drive signal transmitter 41 in the analog processor 5 changes from the high level to the low level at the next timing $t_{26}$, the detection signal Vdet2(1) described in the principle of the self-capacitance detection appears in the wire $J_2$. Because the transistors 92 and 73 are turned ON at the timing $t_{26}$, the detection signal Vdet2(1) appearing in the wire $J_2$ is supplied to the one of the analog input channels of the amplifier 42 in the analog processor 5.

Similarly, when the self-drive signal Vcomts(2) supplied from the other of the analog output channels of the self-drive signal transmitter 41 in the analog processor 5 changes from the high level to the low level at the timing $t_{26}$, the detection signal Vdet2(2) described in the principle of the self-capacitance detection appears in the wire $J_6$. Because the transistors 96 and 74 are turned ON at the timing $t_{26}$, the detection signal Vdet2(2) appearing in the wire $J_6$ is supplied to the other of the analog input channels of the amplifier 42 in the analog processor 5.

When the clock signal CLK supplied from the host HST changes from the low level to the high level at the next timing $t_{27}$, the second controller 4d counts the clock signal CLK, and outputs the high-level signal to the wire $N_3$ in accordance with the count value (=3). As a result, the transistors 93 and 97 in the second connector 4b are turned ON.

When the self-drive signal Vcomts(1) supplied from the one of the analog output channels of the self-drive signal transmitter 41 in the analog processor 5 changes from the low level to the high level at the next timing $t_{28}$, the high-level self-drive signal Vcomts(1) is supplied to the wire $J_3$ via the transistors 73 and 93.

Similarly, when the self-drive signal Vcomts(2) supplied from the other of the analog output channels of the self-drive signal transmitter 41 in the analog processor 5 changes from the low level to the high level at the timing $t_{28}$, the high-level self-drive signal Vcomts(2) is supplied to the wire $J_7$ via the transistors 74 and 97.

When the self-drive signal Vcomts(1) supplied from the one of the analog output channels of the self-drive signal transmitter 41 in the analog processor 5 changes from the high level to the low level at the next timing $t_{29}$, the detection signal Vdet2(1) described in the principle of the self-capacitance detection appears in the wire $J_3$. Because the transistors 93 and 73 are turned ON at the timing $t_{29}$, the detection signal Vdet2(1) appearing in the wire $J_3$ is supplied to the one of the analog input channels of the amplifier 42 in the analog processor 5.

Similarly, when the self-drive signal Vcomts(2) supplied from the other of the analog output channels of the self-drive signal transmitter 41 in the analog processor 5 changes from the high level to the low level at the timing $t_{29}$, the detection signal Vdet2(2) described in the principle of the self-capacitance detection appears in the wire $J_7$. Because the transistors 97 and 74 are turned ON at the timing $t_{29}$, the detection signal Vdet2(2) appearing in the wire $J_7$ is supplied to the other of the analog input channels of the amplifier 42 in the analog processor 5.

When the clock signal CLK supplied from the host HST changes from the low level to the high level at the next timing $t_{30}$, the second controller 4d counts the clock signal CLK, and outputs the high-level signal to the wire $N_4$ in accordance with the count value (=4). As a result, the transistors 94 and 98 in the second connector 4b are turned ON.

When the self-drive signal Vcomts(1) supplied from the one of the analog output channels of the self-drive signal transmitter 41 in the analog processor 5 changes from the low level to the high level at the next timing $t_{31}$, the high-level self-drive signal Vcomts(1) is supplied to the wire $J_4$ via the transistors 73 and 94.

Similarly, when the self-drive signal Vcomts(2) supplied from the other of the analog output channels of the self-drive signal transmitter 41 in the analog processor 5 changes from the low level to the high level at the timing $t_{31}$, the high-level self-drive signal Vcomts(2) is supplied to the wire $J_8$ via the transistors 74 and 98.

When the self-drive signal Vcomts(1) supplied from the one of the analog output channels of the self-drive signal transmitter 41 in the analog processor 5 changes from the high level to the low level at the next timing $t_{32}$, the detection signal Vdet2(1) described in the principle of the self-capacitance detection appears in the wire $J_4$. Because the transistors 94 and 73 are turned ON at the timing $t_{32}$, the detection signal Vdet2(1) appearing in the wire $J_4$ is supplied to the one of the analog input channels of the amplifier 42 in the analog processor 5.

Similarly, when the self-drive signal Vcomts(2) supplied from the other of the analog output channels of the self-drive signal transmitter 41 in the analog processor 5 changes from the high level to the low level at the timing $t_{32}$, the detection signal Vdet2(2) described in the principle of the self-capacitance detection appears in the wire $J_8$. Because the transistors 98 and 74 are turned ON at the timing $t_{32}$, the detection signal Vdet2(2) appearing in the wire $J_8$ is supplied to the other of the analog input channels of the amplifier 42 in the analog processor 5.

From the timing $t_{21}$ to the timing $t_{32}$, the detection device 1 can perform detection for one line in the second detector SE2. By repeating the processing performed from the timing $t_{21}$ to the timing $t_{32}$ the same number of times as the number of lines of the detection electrodes 54, the detection device 1 can perform detection for the entire detection region of the second detector SE2.

While the analog processor 5 of the detection device 1 according to the first embodiment includes the two analog processing channels, the present disclosure is not limited thereto. In a case where the analog processor 5 includes one analog processing channel, the transistor 72 in the first connector 4a may be removed, and the transistors 81 to 88 may be coupled to the transistor 71. Similarly, the transistor 74 in the second connector 4b may be removed, and the transistors 91 to 98 may be coupled to the transistor 73.

In a case where the analog processor 5 includes three analog processing channels, another transistor may be provided in parallel with the transistors 71 and 72 in the first connector 4a, and some of the transistors 81 to 88 may be coupled to this transistor. Similarly, another transistor may be provided in parallel with the transistors 73 and 74 in the second connector 4b, and some of the transistors 91 to 98 may be coupled to this transistor. This configuration is also applicable to a case where the analog processor 5 includes four or more analog processing channels.

Comparative Example

Figure 20:
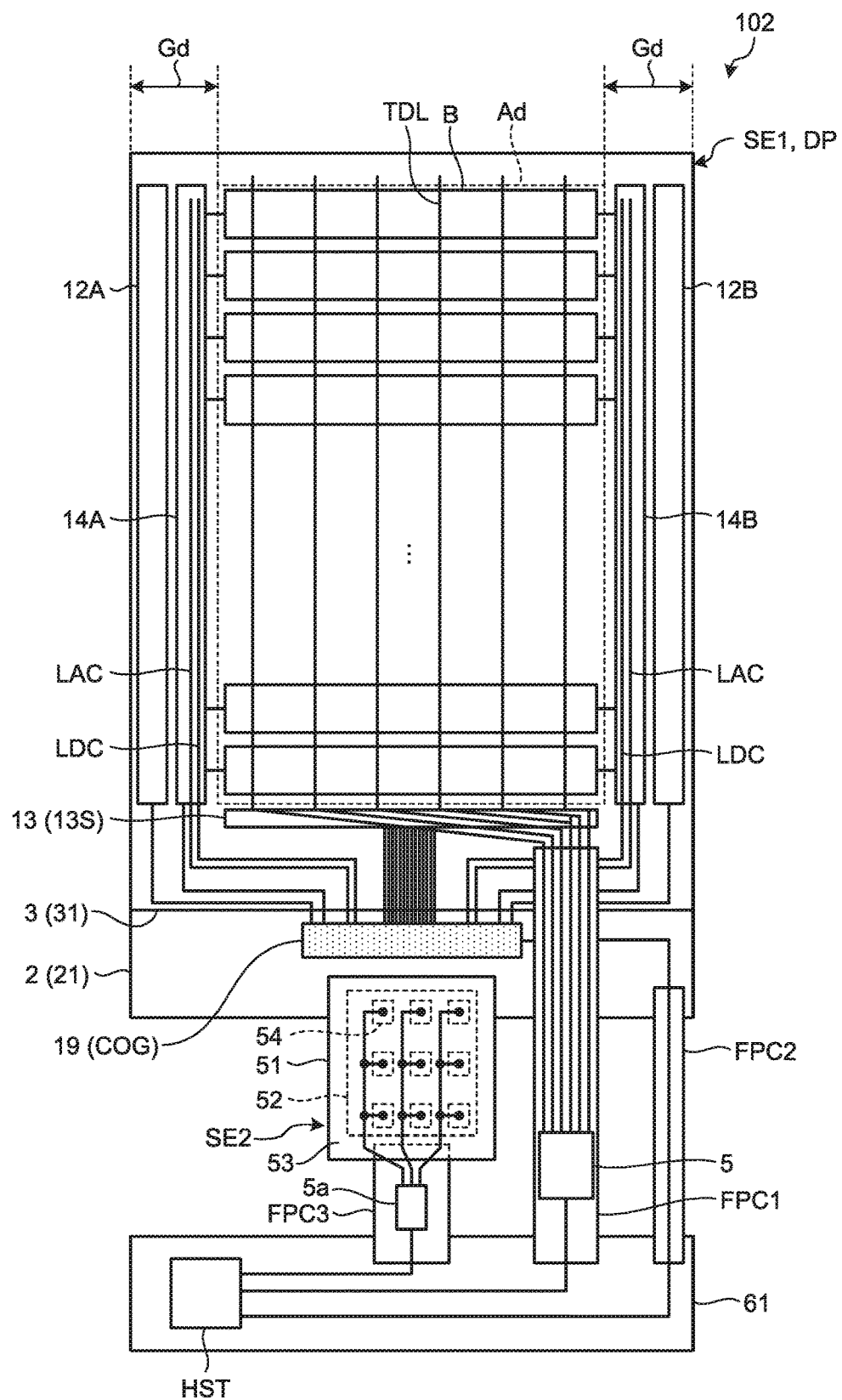
FIG. 20 is a diagram illustrating the detection device according to a comparative example.

FIG. 20 is a diagram illustrating the detection device according to a comparative example. In a detection device 102 according to the comparative example, the first detector SE1 is coupled to the substrate 61 via the printed circuit board FPC1. The second detector SE2 is coupled to the substrate 61 via a printed circuit board FPC3. The analog processor 5 is provided on the printed circuit board FPC1. An analog processor 5a with the same circuit configuration as that of the analog processor 5 is provided on the printed circuit board FPC3. As a modification of the detection device 102, the analog processor 5a may be provided on the substrate 51.

The analog processor 5 performs analog processing on the detection signals Vdet1 supplied from the first detector SE1, and outputs them to the host HST. The analog processor 5a performs analog processing on the detection signals Vdet2 supplied from the second detector SE2, and outputs them to the host HST. As illustrated in FIG. 20, the detection device 102 according to the comparative example requires the two analog processors 5 and 5a.

Advantageous Effects

The detection device 1 according to the first embodiment includes the selector 4 that selects one of the first detector SE1 and the second detector SE2 in accordance with the control signals supplied from the controller 47 in the host HST, and couples the selected one of the first detector SE1 and the second detector SE2 to the analog processor 5. The detection device 1 includes the selector 4, which allows one analog processor 5 to perform analog processing on the detection signals Vdet1 supplied from the first detector SE1 and the detection signals Vdet2 supplied from the second detector SE2.

With this configuration, the detection device 1 according to the first embodiment can eliminate the need for the analog processor 5a of the detection device 102 according to the comparative example. The circuit size of the selector 4 is smaller than that of the analog processor 5a. The detection device 1 can also eliminate the need for the printed circuit board FPC3 of the detection device 102. Consequently, the detection device 1 can have a smaller size, save more space, and be manufactured at a lower cost than the detection device 102 does.

In step with the analog processor 5 including the two analog processing channels, the selector 4 sequentially selects any one of the wires $K_1$ to $K_4$ of the first wire group 111, and couples the selected one to the wire $L_2$. At the same time, the selector 4 selects any one of the wires $K_5$ to $K_8$ of the second wire group 112, and couples the selected one to the wire $L_3$.

As a result, the detection signals Vdet1(1) supplied from the first detector SE1 to the wires $K_1$ to $K_4$ are sequentially supplied to the one of the analog input channels of the amplifier 42 in the analog processor 5. At the same time, the detection signals Vdet1(2) supplied from the first detector SE1 to the wires $K_5$ to $K_8$ are sequentially supplied to the other of the analog input channels of the amplifier 42 in the analog processor 5. Consequently, the detection device 1 can reduce the time required for the first detector SE1 to detect the object F1 substantially by half.

In step with the analog processor 5 including the two analog processing channels, the selector 4 sequentially selects any one of the wires $J_1$ to $J_4$ of the third wire group 113, and couples the selected one to the wire $L_2$. At the same time, the selector 4 selects any one of the wires $J_5$ to $J_8$ of the fourth wire group 114, and couples the selected one to the wire $L_3$.

As a result, the detection signals Vdet2(1) supplied from the second detector SE2 to the wires $J_1$ to $J_4$ are sequentially supplied to the one of the analog input channels of the amplifier 42 in the analog processor 5. At the same time, the detection signals Vdet2(2) supplied from the second detector SE2 to the wires $J_5$ to $J_8$ are sequentially supplied to the other of the analog input channels of the amplifier 42 in the analog processor 5. Consequently, the detection device 1 can reduce the time required for the second detector SE2 to detect the object F2 substantially by half.

Modification

The first connector 4a and the second connector 4b have the same circuit configuration. Specifically, the transistor 71 of the first connector 4a corresponds to the transistor 73 of the second connector 4b. The transistor 72 of the first connector 4a corresponds to the transistor 74 of the second connector 4b. The transistors 81 to 88 of the first connector 4a correspond to the transistors 91 to 98 of the second connector 4b. The second connector 4b is coupled to the second detector SE2 according to the self-capacitance method. Thus, even when the first detector SE1 employs the self-capacitance method, the first connector 4a can be coupled to the first detector SE1. The first connector 4a is coupled to the first detector SE1 according to the mutual capacitance method. Thus, even when the second detector SE2 employs the mutual capacitance method, the second connector 4b can be coupled to the second detector SE2.

Figure 21:
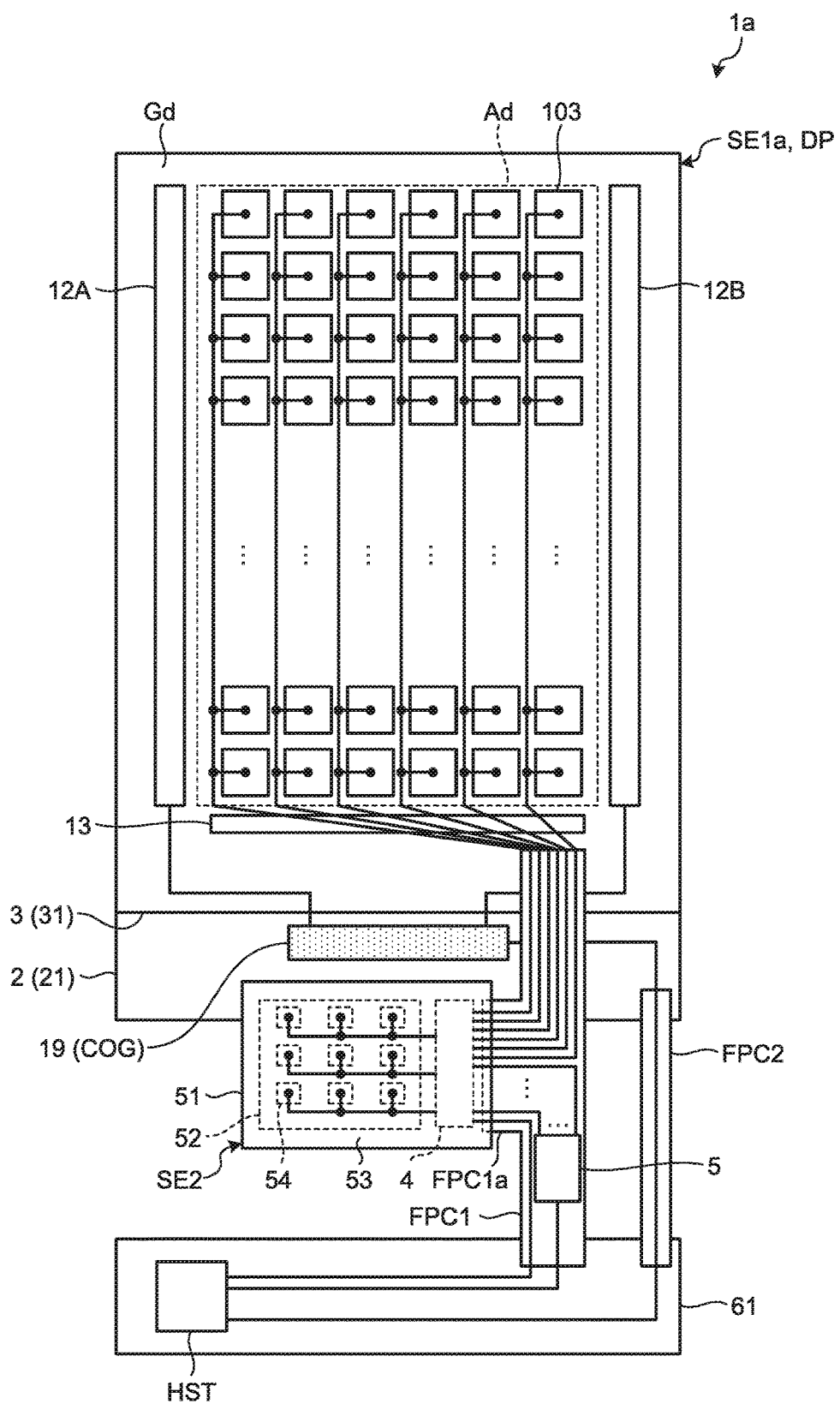
FIG. 21 is a diagram illustrating the detection device according a modification of to the first embodiment.

FIG. 21 is a diagram illustrating the detection device according to a modification of the first embodiment. In a detection device 1a according to the modification of the first embodiment, a first detector SE1a is a sensor using the self-capacitance method. The same components as those in the first embodiment are denoted by like reference numerals, and the explanation thereof is omitted.

The first detector SE1a includes a plurality of detection electrodes 103. The arrangement of the detection electrodes 103 is the same as that of the electrodes in the second detector SE2 described with reference to FIG. 16, and thus the explanation thereof is omitted.

The COG 19 does not necessarily include the mutual drive signal transmitter 7 (refer to FIG. 1) because the first detector SE1a is a sensor using the self-capacitance method.

Figure 22:
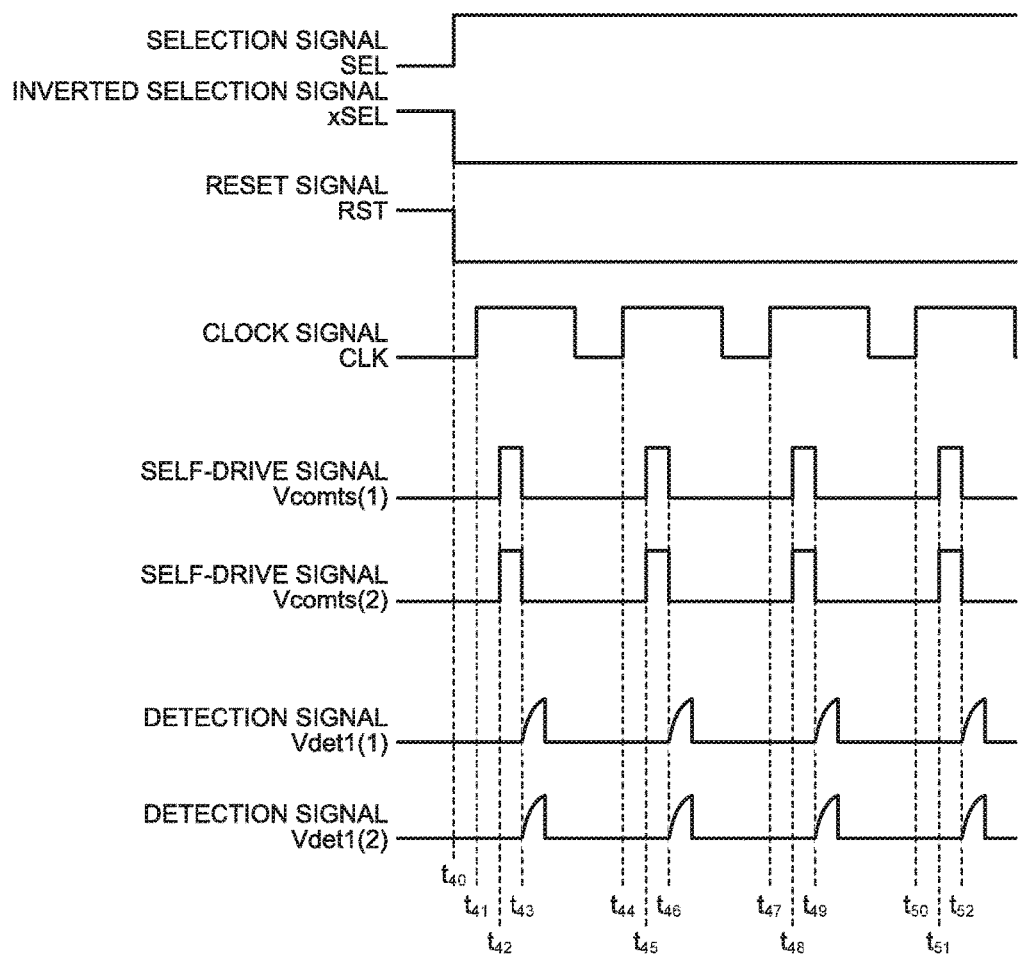
FIG. 22 is a timing chart of an operation performed by the selector of the detection device according to the modification of the first embodiment.

FIG. 22 is a timing chart of an operation performed by the selector of the detection device according to the modification of the first embodiment. Specifically, FIG. 22 is a timing chart when the selector 4 selects the first detector SE1a out of the first detector SE1a and the second detector SE2, and couples the selected first detector SE1a to the analog processor 5.

As illustrated in FIG. 22, when the selection signal SEL supplied from the host HST changes from the low level to the high level at timing $t_{40}$, the transistors 71 and 72 in the first connector 4a are turned ON. When the inverted selection signal xSEL supplied from the host HST changes from the high level to the low level, the transistors 73 and 74 in the second connector 4b are turned OFF. When the reset signal RST changes from the high level to the low level, the resetting of the count value in the first controller 4c is cancelled.

When the clock signal CLK supplied from the host HST changes from the low level to the high level at the next timing $t_{41}$, the first controller 4c counts the clock signal CLK, and outputs the high-level signal to the wire $M_1$ in accordance with the count value (=1). As a result, the transistors 81 and 85 in the first connector 4a are turned ON.

When the self-drive signal Vcomts(1) supplied from the one of the analog output channels of the self-drive signal transmitter 41 in the analog processor 5 changes from the low level to the high level at the next timing $t_{42}$, the high-level self-drive signal Vcomts(1) is supplied to the wire $K_1$ via the transistors 71 and 81.

Similarly, when the self-drive signal Vcomts(2) supplied from the other of the analog output channels of the self-drive signal transmitter 41 in the analog processor 5 changes from the low level to the high level at the timing $t_{42}$, the high-level self-drive signal Vcomts(2) is supplied to the wire $K_5$ via the transistors 72 and 85.

When the self-drive signal Vcomts(1) supplied from the one of the analog output channels of the self-drive signal transmitter 41 in the analog processor 5 changes from the high level to the low level at the next timing $t_{43}$, the detection signal Vdet1(1) described in the principle of the self-capacitance detection (refer to FIGS. 5 to 8) appears in the wire $K_1$. Because the transistors 81 and 71 are turned ON at the timing $t_{43}$, the detection signal Vdet1(1) appearing in the wire $K_1$ is supplied to the one of the analog input channels of the amplifier 42 in the analog processor 5.

Similarly, when the self-drive signal Vcomts(2) supplied from the other of the analog output channels of the self-drive signal transmitter 41 in the analog processor 5 changes from the high level to the low level at the timing $t_{43}$, the detection signal Vdet1(2) described in the principle of the self-capacitance detection appears in the wire $K_5$. Because the transistors 85 and 72 are turned ON at the timing $t_{43}$, the detection signal Vdet1(2) appearing in the wire $K_5$ is supplied to the other of the analog input channels of the amplifier 42 in the analog processor 5.

The detection signals Vdet1(1) and Vdet1(2) illustrated in FIG. 22 do not indicate actual waveforms appearing in the respective wires $K_1$ and $K_5$, but indicate output waveforms in the voltage detector DET in the amplifier 42.

When the clock signal CLK supplied from the host HST changes from the low level to the high level at the next timing $t_{44}$, the first controller 4c counts the clock signal CLK, and outputs the high-level signal to the wire $M_2$ in accordance with the count value (=2). As a result, the transistors 82 and 86 in the first connector 4a are turned ON.

When the self-drive signal Vcomts(1) supplied from the one of the analog output channels of the self-drive signal transmitter 41 in the analog processor 5 changes from the low level to the high level at the next timing $t_{45}$, the high-level self-drive signal Vcomts(1) is supplied to the wire $K_2$ via the transistors 71 and 82.

Similarly, when the self-drive signal Vcomts(2) supplied from the other of the analog output channels of the self-drive signal transmitter 41 in the analog processor 5 changes from the low level to the high level at the timing $t_{45}$, the high-level self-drive signal Vcomts(2) is supplied to the wire $K_6$ via the transistors 72 and 86.

When the self-drive signal Vcomts(1) supplied from the one of the analog output channels of the self-drive signal transmitter 41 in the analog processor 5 changes from the high level to the low level at the next timing $t_{46}$, the detection signal Vdet1(1) described in the principle of the self-capacitance detection appears in the wire $K_2$. Because the transistors 82 and 71 are turned ON at the timing $t_{46}$, the detection signal Vdet1(1) appearing in the wire $K_2$ is supplied to the one of the analog input channels of the amplifier 42 in the analog processor 5.

Similarly, when the self-drive signal Vcomts(2) supplied from the other of the analog output channels of the self-drive signal transmitter 41 in the analog processor 5 changes from the high level to the low level at the timing $t_{46}$, the detection signal Vdet1(2) described in the principle of the self-capacitance detection appears in the wire $K_6$. Because the transistors 86 and 72 are turned ON at the timing $t_{46}$, the detection signal Vdet1(2) appearing in the wire $K_6$ is supplied to the other of the analog input channels of the amplifier 42 in the analog processor 5.

When the clock signal CLK supplied from the host HST changes from the low level to the high level at the next timing $t_{47}$, the first controller 4c counts the clock signal CLK, and outputs the high-level signal to the wire $M_3$ in accordance with the count value (=3). As a result, the transistors 83 and 87 in the first connector 4a are turned ON.

When the self-drive signal Vcomts(1) supplied from the one of the analog output channels of the self-drive signal transmitter 41 in the analog processor 5 changes from the low level to the high level at the next timing $t_{48}$, the high-level self-drive signal Vcomts(1) is supplied to the wire $K_3$ via the transistors 71 and 83.

Similarly, when the self-drive signal Vcomts(2) supplied from the other of the analog output channels of the self-drive signal transmitter 41 in the analog processor 5 changes from the low level to the high level at the timing $t_{48}$, the high-level self-drive signal Vcomts(2) is supplied to the wire $K_7$ via the transistors 72 and 87.

When the self-drive signal Vcomts(1) supplied from the one of the analog output channels of the self-drive signal transmitter 41 in the analog processor 5 changes from the high level to the low level at the next timing $t_{49}$, the detection signal Vdet1(1) described in the principle of the self-capacitance detection appears in the wire $K_3$. Because the transistors 83 and 71 are turned ON at the timing $t_{49}$, the detection signal Vdet1(1) appearing in the wire $K_3$ is supplied to the one of the analog input channels of the amplifier 42 in the analog processor 5.

Similarly, when the self-drive signal Vcomts(2) supplied from the other of the analog output channels of the self-drive signal transmitter 41 in the analog processor 5 changes from the high level to the low level at the timing $t_{49}$, the detection signal Vdet1(2) described in the principle of the self-capacitance detection appears in the wire $K_7$. Because the transistors 87 and 72 are turned ON at the timing $t_{49}$, the detection signal Vdet1(2) appearing in the wire $K_7$ is supplied to the other of the analog input channels of the amplifier 42 in the analog processor 5.

When the clock signal CLK supplied from the host HST changes from the low level to the high level at the next timing $t_{50}$, the first controller 4c counts the clock signal CLK, and outputs the high-level signal to the wire $M_4$ in accordance with the count value (=4). As a result, the transistors 84 and 88 in the first connector 4a are turned ON.

When the self-drive signal Vcomts(1) supplied from the one of the analog output channels of the self-drive signal transmitter 41 in the analog processor 5 changes from the low level to the high level at the next timing $t_{51}$, the high-level self-drive signal Vcomts(1) is supplied to the wire $K_4$ via the transistors 71 and 84.

Similarly, when the self-drive signal Vcomts(2) supplied from the other of the analog output channels of the self-drive signal transmitter 41 in the analog processor 5 changes from the low level to the high level at the timing $t_{51}$, the high-level self-drive signal Vcomts(2) is supplied to the wire $K_8$ via the transistors 72 and 88.

When the self-drive signal Vcomts(1) supplied from the one of the analog output channels of the self-drive signal transmitter 41 in the analog processor 5 changes from the high level to the low level at the next timing $t_{52}$, the detection signal Vdet1(1) described in the principle of the self-capacitance detection appears in the wire $K_4$. Because the transistors 84 and 71 are turned ON at the timing $t_{52}$, the detection signal Vdet1(1) appearing in the wire $K_4$ is supplied to the one of the analog input channels of the amplifier 42 in the analog processor 5.

Similarly, when the self-drive signal Vcomts(2) supplied from the other of the analog output channels of the self-drive signal transmitter 41 in the analog processor 5 changes from the high level to the low level at the timing $t_{52}$, the detection signal Vdet1(2) described in the principle of the self-capacitance detection appears in the wire $K_8$. Because the transistors 88 and 72 are turned ON at the timing $t_{52}$, the detection signal Vdet1(2) appearing in the wire $K_8$ is supplied to the other of the analog input channels of the amplifier 42 in the analog processor 5.

From the timing $t_{41}$ to the timing $t_{52}$, the detection device 1a can perform detection for one line in the first detector SE1a. By repeating the processing performed from the timing $t_{41}$ to the timing $t_{52}$ the same number of times as the number of lines of the detection electrodes 103, the detection device 1a can perform detection for the entire detection region of the first detector SE1a.

The timing chart when the selector 4 selects the second detector SE2 out of the first detector SE1a and the second detector SE2, and couples the selected second detector SE2 to the analog processor 5 is the same as that illustrated in FIG. 19 according to the first embodiment, and thus the explanation and illustration thereof are omitted.

Similarly to the detection device 1 according to the first embodiment, the detection device 1a according to the modification of the first embodiment can eliminate the need for the analog processor 5a of the detection device 102 according to the comparative example. The circuit size of the selector 4 is smaller than that of the analog processor 5a. The detection device 1a can also eliminate the need for the printed circuit board FPC3 of the detection device 102. Consequently, the detection device 1a can save more space and be manufactured at a lower cost than the detection device 102 does.

Second Embodiment

Figure 23:
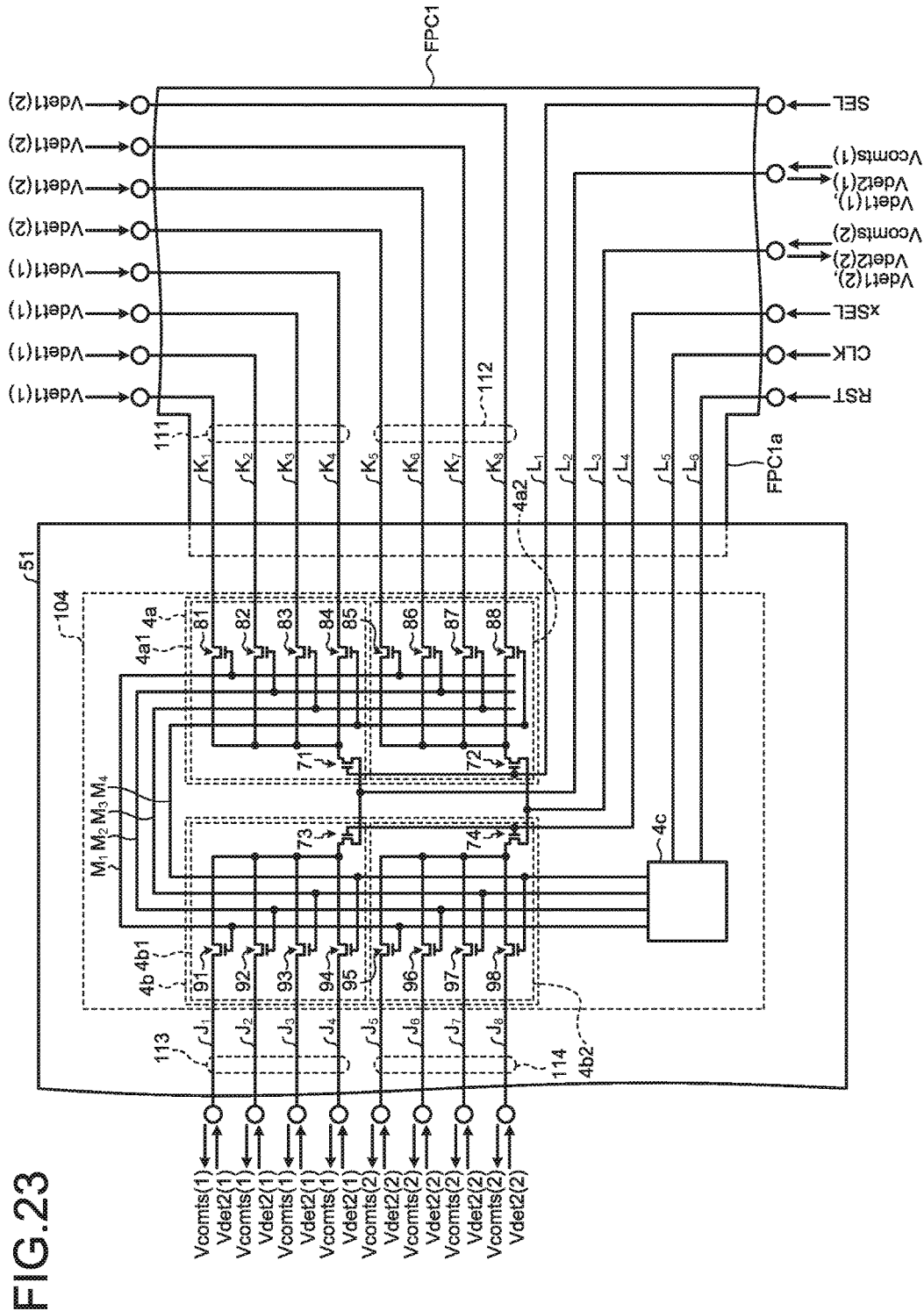
FIG. 23 is a diagram illustrating a circuit configuration of the selector of the detection device according to a second embodiment of the present disclosure.

FIG. 23 is a diagram illustrating a circuit configuration of the selector of the detection device according to a second embodiment of the present disclosure. The same components as those in the first embodiment are denoted by like reference numerals, and the explanation thereof is omitted.

A selector 104 does not include the second controller 4d unlike the selector 4 (refer to FIG. 17) of the detection device 1 according to the first embodiment.

The gates of the transistors 91 and 95 are coupled to the first controller 4c via the wire $M_1$. When high-level signals are supplied from the first controller 4c to the wire $M_1$, the transistors 91 and 95 are turned ON.

The gates of the transistors 92 and 96 are coupled to the first controller 4c via the wire $M_2$. When high-level signals are supplied from the first controller 4c to the wire $M_2$, the transistors 92 and 96 are turned ON.

The gates of the transistors 93 and 97 are coupled to the first controller 4c via the wire $M_3$. When high-level signals are supplied from the first controller 4c to the wire $M_3$, the transistors 93 and 97 are turned ON.

The gates of the transistors 94 and 98 are coupled to the first controller 4c via the wire $M_4$. When high-level signals are supplied from the first controller 4c to the wire $M_4$, the transistors 94 and 98 are turned ON.

The timing chart of an operation performed by the selector 104 is the same as the timing chart (refer to FIGS. 18 and 19) of the operation performed by the selector 4 of the detection device 1 according to the first embodiment, and thus the explanation and illustration thereof are omitted.

Advantageous Effects

The selector 104 according to the second embodiment can have a smaller circuit size by the second controller 4d than that of the selector 4 of the detection device 1 according to the first embodiment. This configuration can increase the yield of the second detector SE2 (when the selector 104 is formed on the substrate 51) or a semiconductor integrated circuit device in which the selector 104 is formed (when the semiconductor integrated circuit device provided with the selector 104 is mounted on the printed circuit board FPC1).

The number of the wires K is preferably equal to that of the wires J because one first controller 4c controls the first connector 4a and the second connector 4b. The present disclosure, however, is applicable to a case where the number of the wires K is different from that of the wires J. In this case, another transistor, for example, may be provided in parallel with the transistors 71 and 72 in the first connector 4a, and wires $K_9$, $K_{10}$, . . . may be coupled to this transistor.

Third Embodiment

Figure 24:
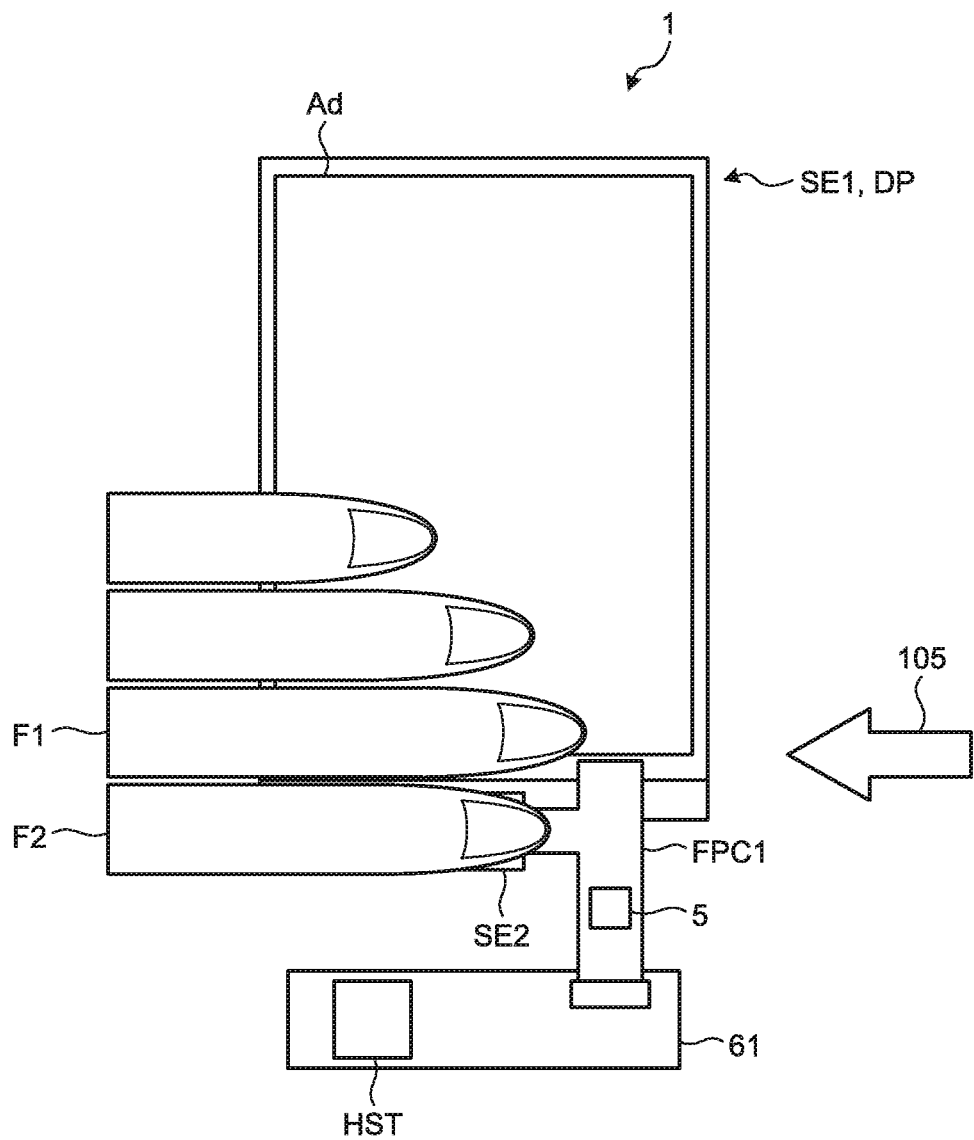
FIG. 24 is a diagram illustrating a state where an object is in contact with or in proximity to the detection device according to a third embodiment of the present disclosure.

FIG. 24 is a diagram illustrating a state where the object is in contact with or in proximity to the detection device according to a third embodiment of the present disclosure. FIG. 25 is a side view schematically illustrating the state where the object is in contact with or in proximity to the detection device according to the third embodiment. Specifically, FIG. 25 is a diagram illustrating the detection device 1 viewed in the direction of an arrow 105 in FIG. 24. The same components as those in the first embodiment are denoted by like reference numerals, and the explanation thereof is omitted.

As illustrated in FIGS. 24 and 25, the object (middle finger of a left hand in this example) F1 is in contact with or in proximity to the detection region of the first detector SE1. The object (index finger of a left hand in this example) F2 is in contact with or in proximity to the detection region of the second detector SE2.

FIG. 26 is a timing chart of an operation performed by the selector of the detection device according to the third embodiment. As illustrated in FIG. 26, when the selection signal SEL supplied from the host HST changes from the high level to the low level at timing $t_{80}$, the transistors 71 and 72 in the first connector 4a are turned OFF. When the inverted selection signal xSEL supplied from the host HST changes from the low level to the high level, the transistors 73 and 74 in the second connector 4b are turned ON. When the reset signal RST changes from the high level to the low level, the resetting of the count value in the second controller 4d is cancelled.

When the clock signal CLK supplied from the host HST changes from the low level to the high level at the next timing $t_{81}$, the second controller 4d counts the clock signal CLK, and outputs the high-level signal to the wire $N_1$ in accordance with the count value (=1). As a result, the transistors 81 and 85 in the second connector 4b are turned ON.

When the mutual drive signal Vcomtm1 supplied from the COG 19 to one drive electrode block B in the first detector SE1 changes to the high level at the next timing $t_{82}$, a change in the voltage in the drive electrode block B is transmitted through a route of the drive electrode COML, the middle finger F1, a hand 107, and the index finger F2 as indicated by an arrow 106. As a result, the detection signal Vdet2 described in the principle of the mutual capacitance detection (refer to FIGS. 2 to 4) appears in the detection electrode 54. Because the transistors 91 and 73 are turned ON at the timing $t_{82}$, the detection signal Vdet2(1) appearing in the wire $J_1$ is supplied to the one of the analog input channels of the amplifier 42 in the analog processor 5. Because the transistors 95 and 74 are also turned ON at the timing $t_{82}$, the detection signal Vdet2(2) appearing in the wire $J_5$ is supplied to the other of the analog input channels of the amplifier 42 in the analog processor 5.

The detection signals Vdet2(1) and Vdet2(2) illustrated in FIG. 26 do not indicate actual waveforms appearing in the detection electrode 54, but indicate output waveforms in the voltage detector DET in the amplifier 42.

When the clock signal CLK supplied from the host HST changes from the low level to the high level at the next timing $t_{83}$, the second controller 4d counts the clock signal CLK, and outputs the high-level signal to the wire $N_2$ in accordance with the count value (=2). As a result, the transistors 92 and 96 in the second connector 4b are turned ON.

When the mutual drive signal Vcomtm1 supplied from the COG 19 to one drive electrode block B in the first detector SE1 changes to the high level at the next timing $t_{84}$, a change in the voltage in the drive electrode block B is transmitted through the route of the drive electrode COML, the middle finger F1, the hand 107, and the index finger F2 as indicated by the arrow 106. As a result, the detection signal Vdet2 described in the principle of the mutual capacitance detection appears in the detection electrode 54. Because the transistors 92 and 73 are turned ON at the timing $t_{84}$, the detection signal Vdet2(1) appearing in the wire $J_2$ is supplied to the one of the analog input channels of the amplifier 42 in the analog processor 5. Because the transistors 96 and 74 are also turned ON at the timing $t_{84}$, the detection signal Vdet2(2) appearing in the wire $J_6$ is supplied to the other of the analog input channels of the amplifier 42 in the analog processor 5.

When the clock signal CLK supplied from the host HST changes from the low level to the high level at the next timing $t_{85}$, the second controller 4d counts the clock signal CLK, and outputs the high-level signal to the wire $N_3$ in accordance with the count value (=3). As a result, the transistors 93 and 97 in the second connector 4b are turned ON.

When the mutual drive signal Vcomtm1 supplied from the COG 19 to one drive electrode block B in the first detector SE1 changes to the high level at the next timing $t_{86}$, a change in the voltage in the drive electrode block B is transmitted through the route of the drive electrode COML, the middle finger F1, the hand 107, and the index finger F2 as indicated by the arrow 106. As a result, the detection signal Vdet2 described in the principle of the mutual capacitance detection appears in the detection electrode 54. Because the transistors 93 and 73 are turned ON at the timing $t_{86}$, the detection signal Vdet2(1) appearing in the wire $J_3$ is supplied to the one of the analog input channels of the amplifier 42 in the analog processor 5. Because the transistors 97 and 74 are also turned ON at the timing $t_{86}$, the detection signal Vdet2(2) appearing in the wire $J_7$ is supplied to the other of the analog input channels of the amplifier 42 in the analog processor 5.

When the clock signal CLK supplied from the host HST changes from the low level to the high level at the next timing $t_{87}$, the second controller 4d counts the clock signal CLK, and outputs the high-level signal to the wire $N_4$ in accordance with the count value (=4). As a result, the transistors 94 and 98 in the second connector 4b are turned ON.

When the mutual drive signal Vcomtm1 supplied from the COG 19 to one drive electrode block B in the first detector SE1 changes to the high level at the next timing $t_{88}$, a change in the voltage in the drive electrode block B is transmitted through the route of the drive electrode COML, the middle finger F1, the hand 107, and the index finger F2 as indicated by the arrow 106. As a result, the detection signal Vdet2 described in the principle of the mutual capacitance detection appears in the detection electrode 54. Because the transistors 94 and 73 are turned ON at the timing $t_{88}$, the detection signal Vdet2(1) appearing in the wire $J_4$ is supplied to the one of the analog input channels of the amplifier 42 in the analog processor 5. Because the transistors 98 and 74 are also turned ON at the timing $t_{88}$, the detection signal Vdet2(2) appearing in the wire $J_8$ is supplied to the other of the analog input channels of the amplifier 42 in the analog processor 5.

From the timing $t_{81}$ to the timing $t_{88}$, the detection device 1 can perform detection for one line in the second detector SE2. By repeating the processing performed from the timing $t_{81}$ to the timing $t_{88}$ the same number of times as the number of lines of the detection electrodes 54, the detection device 1 can perform detection for the entire detection region of the second detector SE2.

Advantageous Effects

The size of the detection electrodes 54 is smaller than that of the drive electrodes COML because the second detector SE2 is a sensor that detects a fingerprint of the finger F2. Specifically, the length of one side of the detection electrodes 54 is shorter than that of the short side of the drive electrodes COML. Due to the small size of the detection electrodes 54, a large voltage cannot be applied to the detection electrodes 54. As a result, the amplitude of the self-drive signals Vcomts applied to the detection electrodes 54 is smaller than that of the mutual drive signals Vcomtm1 applied to the drive electrodes COML. Consequently, according to the first embodiment, the signal/noise (S/N) ratio of the detection signals Vdet2 output from the second detector SE2 is smaller than that of the detection signals Vdet1 output from the first detector SE1.

On the other hand, the drive electrodes COML according to the third embodiment are supplied with the mutual drive signals Vcomtm1, and thus the amplitude of the detection signals Vdet2 output from the second detector SE2 increases. Consequently, the third embodiment can make the S/N ratio of the detection signals Vdet2 output from the second detector SE2 larger than that of the detection signals Vdet2 according to the first embodiment.

While the first detector SE1 according to the third embodiment employs the mutual capacitance method in the description above, it may employ the self-capacitance method (refer to FIG. 21). The length of one side of the detection electrodes 54 is shorter than that of one side of the detection electrodes 103 (refer to FIG. 21). Due to the small size of the detection electrodes 54, a large voltage cannot be applied to the detection electrodes 54. As a result, the amplitude of the self-drive signals Vcomts applied to the detection electrodes 54 is smaller than that of the self-drive signals Vcomts applied to the detection electrodes 103. Consequently, according to the first embodiment, the S/N ratio of the detection signals Vdet2 output from the second detector SE2 is smaller than that of the detection signals Vdet1 output from the first detector SE1.

Meanwhile, applying the self-drive signals Vcomts having large amplitude to the detection electrodes 103 increases the amplitude of the detection signals Vdet2 output from the second detector SE2. Consequently, according to the third embodiment, the S/N ratio of the detection signals Vdet2 output from the second detector SE2 can be made larger than that of the detection signals Vdet2 according to the first embodiment.

In a case where the first detector SE1 employs the self-capacitance method, the selector 4 selects the first detector SE1 first, and couples the first detector SE1 to the analog processor 5. The selector 4 then outputs the self-drive signals Vcomts output from the self-drive signal transmitter 41 in the analog processor 5 to the first detector SE1. Subsequently, the selector 4 selects the second detector SE2, and couples the second detector SE2 to the analog processor 5. The selector 4 then outputs the detection signals Vdet2 output from the second detector SE2 to the amplifier 42 in the analog processor 5.

While the finger F1 is the middle finger of a left hand, and the finger F2 is the index finger of the left hand in the description of the third embodiment, the present disclosure is not limited thereto. The finger F1 may be a finger of a left hand, and the finger F2 may be a finger of a right hand, for example.

While exemplary embodiments according to the present disclosure have been described, the embodiments are not intended to limit the present disclosure. The contents disclosed in the embodiments are given by way of example only, and various changes may be made without departing from the spirit of the present disclosure. Appropriate changes made without departing from the spirit of the invention naturally fall within the technical scope of the present disclosure.

The present disclosure includes the following aspects:
(1) A detection device comprising:
a first detector and a second detector each configured to detect that an object is in contact therewith or in proximity thereto;
a signal processor configured to perform signal processing on a detection signal output from the first detector and the second detector; and
a selector configured to select one of the first detector and the second detector, and couple the selected one of the first detector and the second detector to the signal processor.
(2) The detection device according to (1), wherein
the selector comprises:
a first connector configured to couple the first detector to the signal processor;
a first controller configured to control the first connector to couple the first detector to the signal processor in accordance with a control signal supplied from outside;
a second connector configured to couple the second detector to the signal processor; and
a second controller configured to control the second connector to couple the second detector to the signal processor in accordance with the control signal.
(3) The detection device according to (1), wherein
the selector comprises:
a first connector configured to couple the first detector to the signal processor;
a second connector configured to couple the second detector to the signal processor; and
a first controller configured to control the first connector and the second connector to couple the first detector to the signal processor or couple the second detector to the signal processor in accordance with a control signal supplied from outside.

(4) The detection device according to (2) or (3), wherein
the signal processor comprises a plurality of signal processing channels configured to input or output a plurality of signals simultaneously,
the first connector comprises a plurality of circuits each configured to couple one of a plurality of detection electrode groups of the first detector to one of the signal processing channels, the circuits coupling the respective detection electrode groups to the respective signal processing channels simultaneously, and
the second connector comprises a plurality of circuits each configured to couple one of a plurality of detection electrode groups of the second detector to one of the signal processing channels, the circuits coupling the respective detection electrode groups to the respective signal processing channels simultaneously.

(5) The detection device according to any one of (1) to (4), wherein
the signal processor is provided on a printed circuit board coupled to the first detector and the second detector, and
the selector is provided on the second detector or the printed circuit board.

(6) The detection device according to any one of (1) to (5), wherein
the first detector or the second detector is configured to perform self-capacitance detection,
the signal processor comprises a self-drive signal transmitter configured to output a self-drive signal for performing the self-capacitance detection, and
the selector is configured to output the self-drive signal to a detection electrode of the selected one of the first detector and the second detector, and output the detection signal output from the detection electrode of the selected one of the first detector and the second detector to the signal processor.

(7) The detection device according to any one of (1) to (5), further comprising:
a mutual drive signal transmitter configured to output a mutual drive signal to the first detector for performing mutual capacitance detection when the first detector performs the mutual capacitance detection, wherein
when a first object is in contact with or in proximity to the first detector and a second object is in contact with or in proximity to the second detector, the selector is configured to select the second detector, and output the detection signal output from a detection electrode of the second detector to the signal processor.

(8) The detection device according to any one of (1) to (5), wherein
the first detector or the second detector is configured to perform self-capacitance detection,
the signal processor comprises a self-drive signal transmitter configured to output a self-drive signal for performing the self-capacitance detection, and
when a first object is in contact with or in proximity to the first detector and a second object is in contact with or in proximity to the second detector, the selector is configured to select the first detector to output the self-drive signal to a detection electrode of the first detector, and then select the second detector to output the detection signal output from the second detector to the signal processor.

What is claimed is:
1. A detection device comprising:
a first detector and a second detector each configured to detect that an object is in contact therewith or in proximity thereto;
a signal processor configured to perform signal processing on a detection signal output from the first detector and the second detector; and
a selector configured to select one of the first detector and the second detector, and couple the selected one of the first detector and the second detector to the signal processor,
wherein
the selector comprises:
  a first connector configured to couple the first detector to the signal processor;
  a first controller configured to control the first connector to couple the first detector to the signal processor in accordance with a control signal supplied from outside;
  a second connector configured to couple the second detector to the signal processor; and
  a second controller configured to control the second connector to couple the second detector to the signal processor in accordance with the control signal,
the signal processor comprises a plurality of signal processing channels configured to input or output a plurality of signals simultaneously,
the first connector comprises a plurality of circuits each configured to couple one of a plurality of detection electrode groups of the first detector to one of the signal processing channels, the circuits coupling the respective detection electrode groups to the respective signal processing channels simultaneously, and
the second connector comprises a plurality of circuits each configured to couple one of a plurality of detection electrode groups of the second detector to one of the signal processing channels, the circuits coupling the respective detection electrode groups to the respective signal processing channels simultaneously.

2. The detection device according to claim 1, wherein
the signal processor is provided on a printed circuit board coupled to the first detector and the second detector, and
the selector is provided on the second detector or the printed circuit board.

3. A detection device comprising:
a first detector and a second detector each configured to detect that an object is in contact therewith or in proximity thereto;
a signal processor configured to perform signal processing on a detection signal output from the first detector and the second detector;
a selector configured to select one of the first detector and the second detector, and couple the selected one of the first detector and the second detector to the signal processor; and
a mutual drive signal transmitter configured to output a mutual drive signal to the first detector for performing mutual capacitance detection when the first detector performs the mutual capacitance detection, wherein,
when a first object is in contact with or in proximity to the first detector and a second object is in contact with or in proximity to the second detector, the selector is configured to select the second detector, and output the detection signal output from a detection electrode of the second detector to the signal processor.

4. A detection device comprising:
a first detector and a second detector each configured to detect that an object is in contact therewith or in proximity thereto;
a signal processor configured to perform signal processing on a detection signal output from the first detector and the second detector;
a selector configured to select one of the first detector and the second detector, and couple the selected one of the first detector and the second detector to the signal processor,
wherein
the first detector or the second detector is configured to perform self-capacitance detection,
the signal processor comprises a self-drive signal transmitter configured to output a self-drive signal for performing the self-capacitance detection, and
when a first object is in contact with or in proximity to the first detector and a second object is in contact with or in proximity to the second detector, the selector is configured to select the first detector to output the self-drive signal to a detection electrode of the first detector, and then select the second detector to output the detection signal output from the second detector to the signal processor.

5. The detection device according to claim 3, wherein the selector comprises:
   a first connector configured to couple the first detector to the signal processor;
   a first controller configured to control the first connector to couple the first detector to the signal processor in accordance with a control signal supplied from outside;
   a second connector configured to couple the second detector to the signal processor; and
   a second controller configured to control the second connector to couple the second detector to the signal processor in accordance with the control signal.

6. The detection device according to claim 3, wherein the selector comprises:
   a first connector configured to couple the first detector to the signal processor;
   a second connector configured to couple the second detector to the signal processor; and
   a first controller configured to control the first connector and the second connector to couple the first detector to the signal processor or couple the second detector to the signal processor in accordance with a control signal supplied from outside.

7. The detection device according to claim 3, wherein the signal processor is provided on a printed circuit board coupled to the first detector and the second detector, and
the selector is provided on the second detector or the printed circuit board.

8. The detection device according to claim 4, wherein the selector comprises:
   a first connector configured to couple the first detector to the signal processor;
   a first controller configured to control the first connector to couple the first detector to the signal processor in accordance with a control signal supplied from outside;
   a second connector configured to couple the second detector to the signal processor; and
   a second controller configured to control the second connector to couple the second detector to the signal processor in accordance with the control signal.

9. The detection device according to claim 4, wherein the selector comprises:
   a first connector configured to couple the first detector to the signal processor;
   a second connector configured to couple the second detector to the signal processor; and
   a first controller configured to control the first connector and the second connector to couple the first detector to the signal processor or couple the second detector to the signal processor in accordance with a control signal supplied from outside.

10. The detection device according to claim 4, wherein the signal processor is provided on a printed circuit board coupled to the first detector and the second detector, and
the selector is provided on the second detector or the printed circuit board.

* * * * *